(12) United States Patent
Panec et al.

(10) Patent No.: US 11,070,626 B2
(45) Date of Patent: *Jul. 20, 2021

(54) MANAGING MESSAGES SENT BETWEEN SERVICES

(71) Applicant: salesforce.com, inc., San Francisco, CA (US)

(72) Inventors: Peter A. Panec, Santa Monica, CA (US); Jason Douglas, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 999 days.

This patent is subject to a terminal disclaimer.

(21) Appl. No.: 14/687,729

(22) Filed: Apr. 15, 2015

(65) Prior Publication Data

US 2015/0222713 A1    Aug. 6, 2015

Related U.S. Application Data

(63) Continuation of application No. 11/773,931, filed on Jul. 5, 2007, now Pat. No. 9,037,726, which is a (Continued)

(51) Int. Cl.
*H04L 29/08* (2006.01)
*G06F 9/54* (2006.01)
(Continued)

(52) U.S. Cl.
CPC ........... *H04L 67/141* (2013.01); *G06F 9/465* (2013.01); *G06F 9/54* (2013.01); *G06Q 10/10* (2013.01);
(Continued)

(58) Field of Classification Search
USPC ........................................................ 709/227
See application file for complete search history.

(56) References Cited

U.S. PATENT DOCUMENTS 5,119,377 A   6/1992   Cobb et al.
5,222,234 A   6/1993   Wang et al.
(Continued)

FOREIGN PATENT DOCUMENTS

WO    WO 00/46732    8/2000

OTHER PUBLICATIONS

U.S. Appl. No. 60/278,440, filed Mar. 26, 2001, Brouk et al.
(Continued)

*Primary Examiner* — Younes Naji
(74) *Attorney, Agent, or Firm* — Weaver Austin Villeneuve & Sampson LLP

(57) ABSTRACT

Disclosed are some implementations of methods and apparatus for managing services within a computer network. In one embodiment, a message interchange network for exchanging application-level messages between services, which are located outside the message interchange network, is provided. At the message interchange network, a plurality of application-level messages, which each specify which one or more receiving services are to receive the each application-level message, are received. Each received application-level message is forward towards the one or more receiving services. Correlation information regarding each application-level message that is received into message interchange network is retained. The application-level messages are sent between pairs of the services, and the retained correlation information for each application-level message pertains to each application-level message and any other application-level messages related to the each application-level message.

21 Claims, 8 Drawing Sheets

Related U.S. Application Data continuation of application No. 10/728,356, filed on Dec. 3, 2003, now Pat. No. 7,249,195, which is a continuation-in-part of application No. 09/820,966, filed on Mar. 30, 2001, now Pat. No. 7,689,711.

(51) Int. Cl.

| | | |
|---|---|---|
| *G06Q 10/10* | (2012.01) | |
| *G06F 9/46* | (2006.01) | |
| *H04L 12/721* | (2013.01) | |
| *H04Q 11/04* | (2006.01) | |

(52) U.S. Cl.
CPC ............. *H04L 45/44* (2013.01); *H04L 67/02* (2013.01); *H04L 67/10* (2013.01); *H04L 67/14* (2013.01); *H04L 67/142* (2013.01); *H04L 67/146* (2013.01); *H04L 67/16* (2013.01); *H04L 67/306* (2013.01); *H04L 67/327* (2013.01); *H04M 2203/5063* (2013.01); *H04Q 11/0407* (2013.01)

(56) References Cited

U.S. PATENT DOCUMENTS

| | | | |
|---|---|---|---|
| 5,255,389 A | | 10/1993 | Wang |
| 5,333,312 A | | 7/1994 | Wang |
| 5,448,730 A | | 9/1995 | Bakita et al. |
| 5,724,556 A | | 3/1998 | Souder et al. |
| 5,774,668 A | | 6/1998 | Choquier et al. |
| 5,832,483 A | | 11/1998 | Barker |
| 5,850,518 A | | 12/1998 | Northrup |
| 5,903,652 A | | 5/1999 | Mital |
| 6,023,684 A | * | 2/2000 | Pearson ................. G06Q 20/00 705/36 R |
| 6,065,082 A | | 5/2000 | Blair et al. |
| 6,073,142 A | | 6/2000 | Geiger et al. |
| 6,091,714 A | | 7/2000 | Sensel et al. |
| 6,148,411 A | | 11/2000 | Ichinohe et al. |
| 6,184,823 B1 | | 2/2001 | Smith et al. |
| 6,216,130 B1 | | 4/2001 | Hougaard et al. |
| 6,230,203 B1 | | 5/2001 | Koperda et al. |
| 6,256,667 B1 | | 7/2001 | Wanghlander et al. |
| 6,260,062 B1 | | 7/2001 | Davis et al. |
| 6,272,457 B1 | | 8/2001 | Ford et al. |
| 6,278,977 B1 | | 8/2001 | Agrawal et al. |
| 6,301,611 B1 | | 10/2001 | Matsumoto et al. |
| 6,304,969 B1 | | 10/2001 | Wasserman et al. |
| 6,314,468 B1 | | 11/2001 | Murphy et al. |
| 6,332,163 B1 | | 12/2001 | Bowman-Amuah |
| 6,336,135 B1 | | 1/2002 | Niblett et al. |
| 6,338,074 B1 | | 1/2002 | Poindexter et al. |
| 6,343,290 B1 | | 1/2002 | Cossins et al. |
| 6,393,456 B1 | | 5/2002 | Ambler et al. |
| 6,397,254 B1 | | 5/2002 | Northrup |
| 6,421,705 B1 | | 7/2002 | Northrup |
| 6,438,594 B1 | | 8/2002 | Bowman-Amuah |
| 6,470,357 B1 | | 10/2002 | Garcia, Jr. et al. |
| 6,470,385 B1 | | 10/2002 | Nakashima et al. |
| 6,473,770 B1 | | 10/2002 | Livshutz et al. |
| 6,493,758 B1 | | 12/2002 | McLain |
| 6,499,108 B1 | | 12/2002 | Johnson |
| 6,526,044 B1 | | 2/2003 | Cookmeyer et al. |
| 6,529,489 B1 | | 3/2003 | Kikuchi et al. |
| 6,546,413 B1 | | 4/2003 | Northrup |
| 6,549,944 B1 | | 4/2003 | Weinberg et al. |
| 6,571,141 B1 | * | 5/2003 | Brown ................ G05B 19/0426 700/86 |
| 6,578,076 B1 | | 6/2003 | Putzolu |
| 6,578,147 B1 | | 6/2003 | Shanklin et al. |
| 6,587,466 B1 | | 7/2003 | Bhattacharya et al. |
| 6,587,876 B1 | | 7/2003 | Mahon et al. |
| 6,601,082 B1 | | 7/2003 | Durham et al. |
| 6,633,630 B1 | | 10/2003 | Owens et al. |
| 6,651,087 B1 | | 11/2003 | Dennis |
| 6,665,393 B1 | | 12/2003 | Johnson et al. |
| 6,671,713 B2 | | 12/2003 | Northrup |
| 6,671,746 B1 | | 12/2003 | Northrup |
| 6,704,768 B1 | | 3/2004 | Zombek et al. |
| 6,714,987 B1 | | 3/2004 | Amin et al. |
| 6,718,380 B1 | | 4/2004 | Mohaban et al. |
| 6,725,445 B1 | | 4/2004 | Leymann et al. |
| 6,751,657 B1 | | 6/2004 | Zothner |
| 6,757,729 B1 | * | 6/2004 | Devarakonda .... H04L 29/12009 709/226 |
| 6,763,104 B1 | | 7/2004 | Judkins et al. |
| 6,775,704 B1 | * | 8/2004 | Watson .................... G06F 9/547 709/229 |
| 6,823,522 B1 | | 11/2004 | Lamb |
| 6,829,655 B1 | | 12/2004 | Huang et al. |
| 6,877,023 B1 | | 4/2005 | Maffeis et al. |
| 6,925,488 B2 | | 8/2005 | Bantz et al. |
| 6,944,662 B2 | | 9/2005 | Devine et al. |
| 6,948,063 B1 | | 9/2005 | Ganesan et al. |
| 6,965,878 B1 | | 11/2005 | Heuring |
| 6,988,274 B2 | | 1/2006 | Machin et al. |
| 6,990,513 B2 | | 1/2006 | Belfiore et al. |
| 7,007,032 B1 | | 2/2006 | Chen et al. |
| 7,024,669 B1 | | 4/2006 | Leymann et al. |
| 7,027,997 B1 | | 4/2006 | Robinson et al. |
| 7,028,312 B1 | | 4/2006 | Merrick et al. |
| 7,035,202 B2 | | 4/2006 | Callon |
| 7,047,488 B2 | | 5/2006 | Ingersoll et al. |
| 7,082,532 B1 | | 7/2006 | Vick et al. |
| 7,088,727 B1 | | 8/2006 | Short et al. |
| 7,100,195 B1 | | 8/2006 | Underwood |
| 7,127,613 B2 | | 10/2006 | Pabla et al. |
| 7,181,532 B1 | | 2/2007 | Chan |
| 7,212,621 B1 | * | 5/2007 | Wallenius ............ H04M 3/4217 379/221.01 |
| 7,225,460 B2 | | 5/2007 | Barzilai et al. |
| 7,249,176 B1 | | 7/2007 | Salas et al. |
| 7,249,195 B2 | | 7/2007 | Panec |
| 7,296,061 B2 | | 11/2007 | Martinez et al. |
| 7,305,454 B2 | | 12/2007 | Reese et al. |
| 7,340,508 B1 | * | 3/2008 | Kasi ...................... G06Q 10/10 709/203 |
| 7,363,650 B2 | | 4/2008 | Moriconi et al. |
| 7,412,399 B1 | | 8/2008 | Racca et al. |
| 7,454,750 B2 | | 11/2008 | Fitts et al. |
| 7,496,649 B2 | | 2/2009 | Lee, IV et al. |
| 7,516,191 B2 | | 4/2009 | Brouk et al. |
| 7,546,629 B2 | | 6/2009 | Albert et al. |
| 7,577,953 B1 | | 8/2009 | Verego et al. |
| 7,590,685 B2 | | 9/2009 | Palmeri et al. |
| 7,590,701 B2 | | 9/2009 | Panec et al. |
| 7,603,476 B1 | | 10/2009 | Hofmann et al. |
| 7,689,430 B2 | | 3/2010 | Fremantle et al. |
| 7,689,709 B2 | | 3/2010 | Surma et al. |
| 7,689,711 B2 | | 3/2010 | Brouk et al. |
| 7,703,008 B2 | | 4/2010 | Ingersoll et al. |
| 7,711,694 B2 | | 5/2010 | Moore |
| 7,725,605 B2 | | 5/2010 | Palmeri et al. |
| 7,739,351 B2 | | 6/2010 | Shkvarchuk et al. |
| 7,766,324 B2 | | 8/2010 | Tamura et al. |
| 7,783,725 B2 | | 8/2010 | Chiang et al. |
| 7,788,399 B2 | | 8/2010 | Brouk et al. |
| 7,853,643 B1 | * | 12/2010 | Martinez .................. H04L 69/22 709/203 |
| 7,853,695 B2 | | 12/2010 | Kaler et al. |
| 7,890,544 B2 | | 2/2011 | Swartz et al. |
| 8,027,922 B2 | | 9/2011 | Lee |
| 8,082,491 B1 | * | 12/2011 | Abdelaziz ............ G06F 16/9537 715/234 |
| 8,260,849 B2 | | 9/2012 | Shkvarchuk et al. |
| 8,271,541 B2 | | 9/2012 | Mohan et al. |
| 8,453,196 B2 | | 5/2013 | Learner et al. |
| 8,478,818 B2 | | 7/2013 | Shkvarchuk et al. |
| 8,650,320 B1 | * | 2/2014 | Merrick .................. H04L 69/18 709/230 |
| 8,683,321 B2 | | 3/2014 | Ingersoll et al. |
| 8,838,833 B2 | | 9/2014 | Palmeri et al. |
| 9,032,023 B2 | | 5/2015 | Shkvarchuk et al. |
| 9,037,726 B2 | | 5/2015 | Panec et al. |

(56) References Cited

U.S. PATENT DOCUMENTS

| | | |
|---|---|---|
| 9,197,694 B2 | 11/2015 | Palmeri et al. |
| 9,223,480 B2 | 12/2015 | Bhandarkar et al. |
| 9,244,599 B2 | 1/2016 | Bhandarkar et al. |
| 9,338,214 B2 | 5/2016 | Hinks |
| 9,645,712 B2 | 5/2017 | Bhandarkar et al. |
| 9,674,226 B2 | 6/2017 | Shkvarchuk et al. |
| 9,792,002 B2 | 10/2017 | Bhandarkar et al. |
| 9,916,549 B2 | 3/2018 | Hinks |
| 10,178,050 B2 | 1/2019 | Reese |
| 10,516,700 B2 | 12/2019 | Shkvarchuk et al. |
| 10,778,611 B2 | 9/2020 | Reese |
| 2001/0005358 A1 | 6/2001 | Shiozawa |
| 2001/0044738 A1 | 11/2001 | Elkin et al. |
| 2002/0013854 A1 | 1/2002 | Eggleston et al. |
| 2002/0019797 A1 | 2/2002 | Stewart et al. |
| 2002/0038336 A1 | 3/2002 | Abileah et al. |
| 2002/0040312 A1 | 4/2002 | Dhar et al. |
| 2002/0049815 A1 | 4/2002 | Dattatri |
| 2002/0058277 A1 | 5/2002 | Bathe et al. |
| 2002/0059114 A1 | 5/2002 | Cockrill et al. |
| 2002/0064267 A1 | 5/2002 | Martin et al. |
| 2002/0091533 A1 | 7/2002 | Ims et al. |
| 2002/0095399 A1 | 7/2002 | Devine et al. |
| 2002/0103878 A1 | 8/2002 | Moncibais |
| 2002/0103881 A1 | 8/2002 | Granade et al. |
| 2002/0107957 A1 | 8/2002 | Zargham et al. |
| 2002/0111922 A1 | 8/2002 | Young et al. |
| 2002/0138166 A1 | 9/2002 | Mok et al. |
| 2002/0138577 A1 | 9/2002 | Teng et al. |
| 2002/0143819 A1 | 10/2002 | Han et al. |
| 2002/0161823 A1 | 10/2002 | Casati et al. |
| 2002/0174182 A1 | 11/2002 | Wilkinson et al. |
| 2002/0187750 A1 | 12/2002 | Majumdar |
| 2003/0018808 A1 | 1/2003 | Brouk et al. |
| 2003/0037250 A1 | 2/2003 | Walker et al. |
| 2003/0041178 A1 | 2/2003 | Brouk et al. |
| 2003/0053459 A1 | 3/2003 | Brouk et al. |
| 2003/0058277 A1 | 3/2003 | Bowman-Amuah |
| 2003/0078957 A1 | 4/2003 | Cheeniyil et al. |
| 2003/0079047 A1 | 4/2003 | Fitts et al. |
| 2003/0097447 A1 | 5/2003 | Johnston |
| 2003/0126001 A1 | 7/2003 | Northcutt et al. |
| 2003/0126136 A1 | 7/2003 | Omoigui |
| 2003/0144894 A1 | 7/2003 | Robertson et al. |
| 2003/0149744 A1 | 8/2003 | Bierre et al. |
| 2003/0163726 A1 | 8/2003 | Kidd |
| 2003/0187676 A1 | 10/2003 | Hack et al. |
| 2004/0003084 A1 | 1/2004 | Malik et al. |
| 2004/0025048 A1 | 2/2004 | Porcari et al. |
| 2004/0025117 A1 | 2/2004 | Ingersoll et al. |
| 2004/0034797 A1 | 2/2004 | Becker Hof |
| 2004/0054690 A1 | 3/2004 | Hillerbrand et al. |
| 2004/0068728 A1 | 4/2004 | Blevins |
| 2004/0078373 A1 | 4/2004 | Ghoneimy et al. |
| 2004/0098154 A1 | 5/2004 | McCarthy |
| 2004/0103014 A1 | 5/2004 | Teegan et al. |
| 2004/0117199 A1 | 6/2004 | Fremantle et al. |
| 2004/0117358 A1 | 6/2004 | von Kaenel et al. |
| 2004/0122853 A1 | 6/2004 | Moore |
| 2004/0162741 A1 | 8/2004 | Flaxer et al. |
| 2004/0167834 A1* | 8/2004 | Koskinen ............ H04M 15/43 705/30 |
| 2004/0167987 A1 | 8/2004 | Reese et al. |
| 2004/0176988 A1 | 9/2004 | Boughannam |
| 2004/0186891 A1 | 9/2004 | Panec et al. |
| 2004/0189698 A1 | 9/2004 | Bokish |
| 2004/0215721 A1 | 10/2004 | Szeto et al. |
| 2004/0243574 A1 | 12/2004 | Giroux et al. |
| 2005/0005164 A1 | 1/2005 | Syiek et al. |
| 2005/0027585 A1 | 2/2005 | Wodtke et al. |
| 2005/0080914 A1 | 4/2005 | Lerner et al. |
| 2005/0086297 A1 | 4/2005 | Hinks et al. |
| 2005/0086360 A1 | 4/2005 | Mamou et al. |
| 2005/0108169 A1 | 5/2005 | Balasubramanian et al. |
| 2005/0119926 A1 | 6/2005 | Turetsky et al. |
| 2005/0166209 A1 | 7/2005 | Merrick et al. |
| 2005/0198121 A1 | 9/2005 | Daniels et al. |
| 2005/0216555 A1 | 9/2005 | English et al. |
| 2005/0228863 A1 | 10/2005 | Palmeri et al. |
| 2005/0234928 A1 | 10/2005 | Shkvarchuk et al. |
| 2005/0246424 A1 | 11/2005 | Panec et al. |
| 2006/0021019 A1 | 1/2006 | Hinton et al. |
| 2006/0031225 A1 | 2/2006 | Palmeri et al. |
| 2006/0059423 A1 | 3/2006 | Lehmann et al. |
| 2006/0069605 A1 | 3/2006 | Hatoun |
| 2006/0143591 A1 | 6/2006 | Hilerio et al. |
| 2006/0150095 A1 | 7/2006 | Ingersoll et al. |
| 2006/0155871 A1 | 7/2006 | Iikka et al. |
| 2006/0240396 A1 | 10/2006 | Foo et al. |
| 2007/0005777 A1 | 1/2007 | Fremantle et al. |
| 2007/0078950 A1 | 4/2007 | Hopkins et al. |
| 2007/0088702 A1 | 4/2007 | Fridella et al. |
| 2007/0112976 A1 | 5/2007 | Anders et al. |
| 2007/0129979 A1 | 6/2007 | Kumagai et al. |
| 2007/0136357 A1 | 6/2007 | van Wyk et al. |
| 2007/0143455 A1 | 6/2007 | Gorman et al. |
| 2007/0143736 A1 | 6/2007 | Moriarty et al. |
| 2007/0156793 A1 | 7/2007 | D'Souza et al. |
| 2007/0174342 A1 | 7/2007 | Maeda et al. |
| 2008/0016242 A1 | 1/2008 | Panec et al. |
| 2008/0052775 A1 | 2/2008 | Sandhu et al. |
| 2008/0086564 A1 | 4/2008 | Putman et al. |
| 2008/0107130 A1 | 5/2008 | Peters et al. |
| 2008/0114475 A1 | 5/2008 | Wiersema |
| 2008/0196007 A1 | 8/2008 | Chiang et al. |
| 2008/0253362 A1 | 10/2008 | Samarasinghe et al. |
| 2008/0306806 A1 | 12/2008 | Van Wyk et al. |
| 2008/0307392 A1 | 12/2008 | Racca et al. |
| 2008/0313003 A1 | 12/2008 | Racca et al. |
| 2009/0019534 A1 | 1/2009 | Bakshi et al. |
| 2009/0024676 A1 | 1/2009 | Boyd et al. |
| 2009/0187453 A1 | 7/2009 | Dill et al. |
| 2009/0240705 A1 | 9/2009 | Miloushev et al. |
| 2010/0223301 A1 | 9/2010 | Shkvarchuk et al. |
| 2010/0235445 A1 | 9/2010 | Palmeri et al. |
| 2010/0250712 A1 | 9/2010 | Ellison et al. |
| 2011/0093610 A1 | 4/2011 | Rezaiifar et al. |
| 2012/0254291 A1 | 10/2012 | Feldman et al. |
| 2012/0303698 A1 | 11/2012 | Shkvarchuk et al. |
| 2013/0047090 A1 | 2/2013 | Bhandarkar et al. |
| 2013/0198645 A1 | 8/2013 | Bhandarkar et al. |
| 2013/0246933 A1 | 9/2013 | Bhandarkar et al. |
| 2014/0040974 A1 | 2/2014 | Shkvarchuk et al. |
| 2015/0006627 A1 | 1/2015 | Palmeri et al. |
| 2015/0222668 A1 | 8/2015 | Shkvarchuk et al. |
| 2016/0182645 A1 | 6/2016 | Panec et al. |
| 2016/0191614 A1 | 6/2016 | Palmeri et al. |
| 2016/0253612 A1 | 9/2016 | Hinks |
| 2018/0020025 A1 | 1/2018 | Shkvarchuk et al. |
| 2019/0363996 A1 | 11/2019 | Reese |

OTHER PUBLICATIONS

U.S. Office Action dated Nov. 14, 2007 issued in U.S. Appl. No. 10/858,709.
U.S. Office Action Final dated Aug. 5, 2008 issued in U.S. Appl. No. 10/858,709.
U.S. Office Action dated Jan. 8, 2009 issued in U.S. Appl. No. 10/858,709.
U.S. Office Action Final dated Aug. 19, 2009 issued in U.S. Appl. No. 10/858,709.
U.S. Office Action dated Feb. 5, 2010 issued in U.S. Appl. No. 10/858,709.
U.S. Office Action Final dated Sep. 8, 2010 issued in U.S. Appl. No. 10/858,709.
U.S. Advisory Action dated Dec. 2, 2010 issued in U.S. Appl. No. 10/858,709.
U.S. Office Action dated Apr. 27, 2011 issued in U.S. Appl. No. 10/858,709.
U.S. Office Action Final dated Feb. 1, 2012 issued in U.S. Appl. No. 10/858,709.
U.S. Decision Granting Request for Prioritized Examination dated May 22, 2012 issued in U.S. Appl. No. 10/858,709.

(56) References Cited

OTHER PUBLICATIONS

U.S. Office Action dated Jun. 27, 2012 issued in U.S. Appl. No. 10/858,709.
U.S. Notice of Allowance dated Nov. 16, 2012 issued in U.S. Appl. No. 10/858,709.
U.S. Office Action dated Sep. 21, 2004 issued in U.S. Appl. No. 10/728,356.
U.S. Office Action dated Jun. 6, 2005 issued in U.S. Appl. No. 10/728,356.
U.S. Office Action Final dated Sep. 30, 2005 issued in U.S. Appl. No. 10/728,356.
U.S. Office Action dated May 24, 2006 issued in U.S. Appl. No. 10/728,356.
U.S. Notice of Allowance dated May 21, 2007 issued in U.S. Appl. No. 10/728,356.
U.S. Office Action dated May 26, 2009 issued in U.S. Appl. No. 11/773,931.
U.S. Office Action Final dated Feb. 1, 2010 issued in U.S. Appl. No. 11/773,931.
U.S. Office Action dated Oct. 27, 2011 issued in U.S. Appl. No. 11/773,931.
U.S. Office Action Final dated Jul. 10, 2012 issued in U.S. Appl. No. 11/773,931.
U.S. Office Action dated Jan. 30, 2013 issued in U.S. Appl. No. 11/773,931.
U.S. Final Office Action dated Mar. 27, 2014 issued in U.S. Appl. No. 11/773,931.
U.S. Notice of Allowance dated Jan. 22, 2015 issued in U.S. Appl. No. 11/773,931.
U.S. Office Action dated Feb. 5, 2008 issued in U.S. Appl. No. 10/820,650.
U.S. Office Action dated Oct. 28, 2008 issued in U.S. Appl. No. 10/820,650.
U.S. Notice of Allowance dated Mar. 13, 2009 issued in U.S. Appl. No. 10/820,650.
U.S. Notice of Allowance dated Jun. 18, 2009 issued in U.S. Appl. No. 10/820,650.
U.S. Office Action dated Dec. 6, 2007 issued in U.S. Appl. No. 10/808,212.
U.S. Office Action Final dated Aug. 7, 2008 issued in U.S. Appl. No. 10/808,212.
U.S. Office Action dated Mar. 13, 2009 issued in U.S. Appl. No. 10/808,212.
U.S. Notice of Allowance dated Sep. 21, 2009 issued in U.S. Appl. No. 10/808,212.
U.S. Supplemental Notice of Allowability and Examiner Interview Summary dated Dec. 2, 2009 issued in U.S. Appl. No. 10/808,212.
U.S. Notice of Allowance dated Feb. 5, 2010 issued in U.S. Appl. No. 10/808,212.
U.S. Office Action dated Dec. 22, 2011 issued in U.S. Appl. No. 12/777,164.
U.S. Notice of Allowance dated May 2, 2012 issued in U.S. Appl. No. 12/777,164.
U.S. Office Action dated Nov. 5, 2012 issued in U.S. Appl. No. 13/563,365.
U.S. Notice of Allowance dated Jan. 15, 2013 issued in U.S. Appl. No. 13/563,365.
U.S. Notice of Allowance dated May 24, 2013 issued in U.S. Appl. No. 13/563,365.
U.S. Office Action dated Aug. 6, 2014 issued in U.S. Appl. No. 13/859,583.
U.S. Notice of Allowance dated Jan. 20, 2015 issued in U.S. Appl. No. 13/859,583.
U.S. Office Action dated Dec. 14, 2004 issued in U.S. Appl. No. 09/820,966.
U.S. Office Action Final dated May 19, 2005 issued in U.S. Appl. No. 09/820,966.
U.S. Office Action dated Jun. 20, 2005 issued in U.S. Appl. No. 09/820,966.
U.S. Office Action Final dated Sep. 30, 2005 issued in U.S. Appl. No. 09/820,966.
U.S. Office Action dated Jul. 3, 2006 issued in U.S. Appl. No. 09/820,966.
U.S. Office Action Final dated Apr. 18, 2007 issued in U.S. Appl. No. 09/820,966.
U.S. Office Action dated Aug. 27, 2007 issued in U.S. Appl. No. 09/820,966.
U.S. Office Action Final dated Apr. 16, 2008 issued in U.S. Appl. No. 09/820,966.
U.S. Office Action dated Jan. 9, 2009 issued in U.S. Appl. No. 09/820,966.
U.S. Notice of Allowance dated Nov. 16, 2009 issued in U.S. Appl. No. 09/820,966.
U.S. Office Action dated Feb. 9, 2005 issued in U.S. Appl. No. 09/820,964.
U.S. Office Action Final dated Jul. 13, 2005 issued in U.S. Appl. No. 09/820,964.
U.S. Office Action dated Dec. 28, 2005 issued in U.S. Appl. No. 09/820,964.
U.S. Office Action Final dated Jun. 27, 2006 issued in U.S. Appl. No. 09/820,964.
U.S. Office Action dated Jan. 25, 2007 issued in U.S. Appl. No. 09/820,964.
U.S. Office Action Final dated Jul. 10, 2007 issued in U.S. Appl. No. 09/820,964.
U.S. Office Action dated Dec. 27, 2007 issued in U.S. Appl. No. 09/820,964.
U.S. Office Action Final dated Sep. 3, 2008 issued in U.S. Appl. No. 09/820,964.
U.S. Office Action dated Mar. 30, 2009 issued in U.S. Appl. No. 09/820,964.
U.S. Office Action Final dated Nov. 12, 2009 issued in U.S. Appl. No. 09/820,964.
U.S. Notice of Allowance dated May 24, 2010 issued in U.S. Appl. No. 09/820,964.
U.S. Office Action dated Jul. 15, 2010 issued in U.S. Appl. No. 09/820,964.
U.S. Office Action dated Oct. 26, 2004 issued in U.S. Appl. No. 09/820,965.
U.S. Office Action dated Jun. 6, 2005 issued in U.S. Appl. No. 09/820,965.
U.S. Office Action Final dated Sep. 28, 2005 issued in U.S. Appl. No. 09/820,965.
U.S. Examiner's Interview Summary dated Aug. 3, 2005 issued in U.S. Appl. No. 09/820,965.
U.S. Office Action dated Jun. 14, 2006 issued in U.S. Appl. No. 09/820,965.
U.S. Office Action dated Dec. 28, 2006 issued in U.S. Appl. No. 09/820,965.
U.S. Office Action Final dated Jul. 11, 2007 issued in U.S. Appl. No. 09/820,965.
U.S. Examiner Interview Summary dated Oct. 9, 2007 issued in U.S. Appl. No. 09/820,965.
U.S. Office Action dated Dec. 28, 2007 issued in U.S. Appl. No. 09/820,965.
U.S. Notice of Allowance and Examiner's Amendment dated Sep. 8, 2008 issued in U.S. Appl. No. 09/820,965.
U.S. Notice of Allowance dated Dec. 18, 2008 issued in U.S. Appl. No. 09/820,965.
U.S. Office Action dated Jan. 22, 2009 issued in U.S. Appl. No. 09/820,965.
U.S. Office Action dated Feb. 3, 2009 issued in U.S. Appl. No. 09/820,965.
U.S. Office Action dated Feb. 12, 2009 issued in U.S. Appl. No. 09/820,965.
U.S. Office Action dated Feb. 25, 2009 issued in U.S. Appl. No. 09/820,965.
U.S. Office Action dated Feb. 2, 2009 issued in U.S. Appl. No. 11/016,566.
U.S. Office Action Final dated Jul. 15, 2009 issued in U.S. Appl. No. 11/016,566.

(56) References Cited

OTHER PUBLICATIONS

U.S. Notice of Allowance date Dec. 24, 2009 issued in U.S. Appl. No. 11/016,566.
U.S. Office Action dated Oct. 29, 2010 issued in U.S. Appl. No. 12/753,709.
U.S. Final Office Action dated Apr. 15, 2011 issued in U.S. Appl. No. 12/753,709.
U.S. Office Action dated Sep. 26, 2011 issued in U.S. Appl. No. 12/753,709.
U.S. Final Office Action dated Apr. 25, 2012 issued in U.S. Appl. No. 12/753,709.
U.S. Office Action dated Jan. 17, 2013 issued in U.S. Appl. No. 12/753,709.
U.S. Office Action dated Aug. 30, 2013 issued in U.S. Appl. No. 12/753,709.
U.S. Notice of Allowance dated Jan. 31, 2014 issued in U.S. Appl. No. 12/753,709.
U.S. Notice of Allowance dated May 23, 2014 issued in U.S. Appl. No. 12/753,709.
U.S. Office Action dated Mar. 6, 2015 issued in U.S. Appl. No. 14/487,052.
BizTalk Framework Overview (2000) downloaded from Biztalk.org website at http://www.biztalk.org/Biztalk/framework.asp; Retrieved from internet on Nov. 8, 2000, 3 pages.
Coblist: —Cob: Welcome to my photo album! (2000) retrieved from internet at http://www.deatech.com/natural/coblist/coblist-we/2000/0484.html; dated Sep. 25, 2000, pp. 1-2.
CrossGAIN: A New Foundation for the Web (2000), overview downloaded from Crossgain.com website at http://www.crossgain.com; Retrieved from internet on Sep. 22, 2000, 1 page.
CrossWeave™—Extending the Enterprise (2001), company overview downloaded from CrossWeave.com website at http://www.crossweave.com/company_overview.html; Retrieved from internet on Apr. 1, 2002, 1 page.
ebXML: Creating a Single Global Electronic Market (2000) OASIS UN CEFACT, copyright ebXML 2000, ebXML Technical Architecture Team, Oct. 17, 2000, 46 pages.
"Evite.com Launches Free Web-based Group Activity Organizer," retrieved from the Internet at www.proquest.com, *PR Newswire*, ProQuest Doc. ID: 43258854, Jul. 19, 1999, pp. 1-2.
"Evite Relies on MySQL to Deliver Millions of Invitations," retrieved from www.mysql.com, *My SQL, The World's Most Popular Open Source Database*, MySQL.com, 1998, 4 pages.
"Evite Tour," Mar. 2001, retrieved from the Internet at http://web/archive.org/web/2001027073617/www.evite.com/ tour?printAll+ok, Evite Mar. 2001, pp. 1-9.
"Excite@Home: Excite's #1 webshots provides users with comprehensive photo capabilities; Unveiling "My Photos" where Excite users can create personal albums, share photos, search photos and order quality prints by Ofoto," [Retrieved from internet at www.proquest.com, on May 24, 2005] ProQuest Doc. ID: 54811626, Jorgensen, M2 Presswire, Coventry: Jun. 5, 2000, 3 pages.
Festa, Paul (2000) "Start-up gains Netscape funding, Microsoft engineers,"CNET News.com, dated Sep. 10, 2000 downloaded from CNET.com website at http://news.com.com/2100-1017-245521.html; Retrieved from internet on Apr. 1, 2002, 2 pages.
GlueCode: Our Mission and Vision (2002) downloaded from Gluecode.com website at URL:http://www.gluecode.com/company/mission_vision.html, p. 1 [Retrieved from internet on Apr. 1, 2002], 1 page.
Gluecode™ (2000), Company overview and product guide downloaded from Glucode.com website at http://www.glucode.com; Retrieved from internet on Sep. 22, 2000, 18 pages.
Grand, Mark (1993) MIME Overview, downloaded from Mindspring.com website at http://www.mindspring.com/~mgrand/mime.html; Revised Oct. 26, 1993; Retrieved from internet on Mar. 1, 2001, 13 pages.
Greef, Arthur (1998) "Partner Interface Process Technical Architecture," RosettaNet/PIP Technical Architecture.doc dated Apr. 1, 2002, pp. 1-12.
Greenbaum, Joshua (2000) "Next Generation E-Business Trading Networks: Intelligent Hubs and Viquity's Nexus Solution," Enterprise Applications Consulting, Berkeley, CA (www.eaconsult.com), pp. 1-20.
ipo.com—Venture Portfolio Company Profile (2002), downloaded from ipo.com website at http://www.ipo.com/venture/_pcprofile.asp?p=IPO&pc=20323; Retrieved from internet on Apr. 1, 2002, 1 page.
La Quey, Robert E. (1999), "SML: Simplifying XML," retrieved from Internet at www.XML.com, dated Nov. 24, 1999, pp. 1-6.
Slam Dunk Networks (2000), Company overview and product guide downloaded from Slamdunknetworks.com website at http://www.slamdunknetworks.com; Retrieved from internet on Sep. 22, 2000, 15 pages.
Slam Dunk Networks℠: A global Infrastructure for the Guaranteed Delivery of B2B Transactions over the Internet, Copyright 2000 Slam Dunk Networks, Inc., 19 pages.
Stross, Kenner (2000) "Managed B2B Infrastructure Technical Architecture," Jul. 31, 2000, Transactplus™ business quality internet, Transact Technical Architecture, pp. 1-14.
"Trails.com Teams Up With Evite to Offer Email Trip Planning Service," retrieved from Internet at www.trails.com,*Homes*, 2000.
TransactPlus Network (2000), Company overview and product guide downloaded from TransactPlus.com website at http://www.transactplus.com; Retrieved from internet on Sep. 22, 2000, 13 pages.
Viquity Dynamic Commerce Network™ (DCN) (2000), Company Overview and Service Description downloaded from Viquity.com website at http://www.viquity.com/solutions/architecture.html; Retrieved from internet on Sep. 22, 2000, 2 pages.
Viquity Press Release (2000) "Viquity Demonstrates Power of Hub Technology in ebXML Proof-of-Concept," dated Dec. 12, 2000, downloaded from Viquity.com website at http://www.viquity.com/news_events/pr_detail.asp; Retrieved from internet on Apr. 1, 2002, 2 pages.
U.S. Office Action dated May 3, 2018 issued in U.S. Appl. No. 15/056,236.
U.S. Notice of Allowance dated Jan. 31, 2017 issued in U.S. Appl. No. 14/686,461.
U.S. Office Action dated Mar. 11, 2016 issued in U.S. Appl. No. 14/226,381.
U.S. Final Office Action dated Oct. 19, 2016 issued in U.S. Appl. No. 14/226,381.
U.S. Office Action dated Sep. 7, 2017 issued in U.S. Appl. No. 14/226,381.
U.S. Notice of Allowance dated Feb. 12, 2018 issued in U.S. Appl. No. 14/226,381.
U.S. Notice of Allowance dated May 10, 2018 issued in U.S. Appl. No. 14/226,381.
U.S. Notice of Allowance dated Jul. 16, 2015 issued in U.S. Appl. No. 14/487,052.
U.S. Office Action dated May 19, 2017 issued in U.S. Appl. No. 14/949,505.
U.S. Final Office Action dated Oct. 19, 2017 issued in U.S. Appl. No. 14/949,505.
U.S. Office Action dated Apr. 27, 2018 issued in U.S. Appl. No. 14/949,505.
U.S. Final Office Action dated Jan. 7, 2019 issued in U.S. Appl. No. 15/056,236.
U.S. Office Action dated Feb. 26, 2019 issued in U.S. Appl. No. 15/584,857.
U.S. Notice of Allowance dated Aug. 31, 2018 issued in U.S. Appl. No. 14/226,381.
U.S. Final Office Action dated Oct. 4, 2018 issued in U.S. Appl. No. 14/949,505.
U.S. Office Action dated Feb. 7, 2019 issued in U.S. Appl. No. 14/949,505.
U.S. Appl. No. 16/211,508, filed Dec. 6, 2018, Reese.
U.S. Notice of Allowance dated May 30, 2019 issued in U.S. Appl. No. 15/584,857.
U.S. Notice of Allowance dated Aug. 19, 2019 issued in U.S. Appl. No. 15/584,857.

(56) References Cited

OTHER PUBLICATIONS

U.S. Final Office Action dated Jul. 1, 2019 issued in U.S. Appl. No. 14/949,505.
U.S. Office Action dated Apr. 1, 2020 issued in U.S. Appl. No. 16/211,508.
U.S. Office Action dated Dec. 5, 2019 issued in U.S. Appl. No. 14/949,505.
U.S. Final Office Action dated Apr. 8, 2020 issued in U.S. Appl. No. 14/949,505.
U.S. Notice of Allowance dated May 14, 2020 issued in U.S. Appl. No. 16/211,508.
U.S. Appl. No. 16/947,821, filed Aug. 19, 2020, Reese.

* cited by examiner

240

| Hop ID | Message Info | Call ID | Session ID |
|---|---|---|---|
| hop1 | info1 | call1 | session1 |
| hop2 | info2 | call1 | session1 |
| hop3 | info3 | call2 | session1 |
| hop4 | info4 | call3 | session2 |

490

| Call ID | Call Info |
|---|---|
| call1 | info1 |
| call2 | info2 |
| call3 | info3 |
| call4 | info4 |

492

| Session ID | Session Info |
|---|---|
| session1 | info1 |
| session2 | info2 |
| session3 | info3 |
| session4 | info4 |

MANAGING MESSAGES SENT BETWEEN SERVICES

PRIORITY DATA

This patent document is a continuation and claims priority of co-pending U.S. patent application Ser. No. 11/773,931, entitled APPARATUS AND METHODS FOR MANAGING MESSAGES SENT BETWEEN SERVICES, filed Jul. 5, 2007 by Panec et al., which is a continuation and claims priority of U.S. patent application Ser. No. 10/728,356, now U.S. Pat. No. 7,249,195, entitled APPARATUS AND METHODS FOR CORRELATING MESSAGES SENT BETWEEN SERVICES, filed Dec. 3, 2003 by Panec et al., which is a continuation-in-part and claims priority of U.S. patent application Ser. No. 09/820,966, now U.S. Pat. No. 7,689,711 entitled SYSTEM AND METHOD FOR ROUTING MESSAGES BETWEEN APPLICATIONS, filed Mar. 30, 2001 by Brouk et al. The above-identified applications and patents are hereby incorporated by reference in their entirety for all purposes.

BACKGROUND

Some of the disclosed implementations relate to methods and apparatus for processing data within a computer network. More specifically, some of the implementations relate to correlating messages sent within such computer network.

Corporate reliance on technology has become more complex and more pervasive. Increasingly, companies are identifying opportunities to extend their core business or cut costs using the Internet. Both trends have put increasing priority on integrating disparate business applications. For this reason, enterprise application integration (EAI) has emerged as a solution for allowing information technology departments to build bridges that are designed to unify their legacy systems into a single enterprise application. Ideally, the creation of this single enterprise application would not require sweeping changes to the underlying structures.

EAI suppliers typically offer end point solutions for managing business process interactions between end points within a computer network. Although a specific enterprise software package may be designed to transparently handle diverse business processes carried out by two or more end nodes, each specific enterprise software package requires releasing customized connectors or adapters which will work for the specific business processes and applications used by the specific end nodes. As a result, these enterprise solutions are not easily scalable. Additionally, scores of adapters need to be built for each vendor (for example, Oracle corporation of Redwood Shores, Calif., SAP AG of Waldorf, Germany, and PeopleSoft Inc. of Pleasanton, Calif.). As each supplier releases new versions of their software, EAI vendors find themselves unable to gain traction under the burden of supporting their existing adapters.

Notwithstanding the benefits of EAI, the software costs and resource investments of EAI prevent small-to-medium enterprise (SME) customers from embracing EAI solutions. For SMEs, reliance on application service providers (ASPs) represents an increasingly attractive alternative.

The web service provider market is one of the fastest growing segments of the software industry. Service providers make enterprise applications (e.g., human resources administration, recruiting, travel and expense management, sales force automation) available to customers over the web at a server device. Those applications are fully managed and hosted by the provider, providing significant cost savings to enterprises.

Some providers merely host and manage third-party packaged software for their customers ("managed hosts"). Others build new applications from the ground up to take advantage of the benefits and cost-savings of web service provider model. Service providers enjoy the profit margins and operational scalability of consumer Web companies like eBay Inc. of San Jose, Calif., and Yahoo! Inc. of Sunnyvale, Calif., while at the same time offering the feature sets of complex enterprise software applications such as software applications by PeopleSoft and Siebel Systems Inc. of San Mateo, Calif.

Although the service provider approach allows a single business to set up a host server for allowing itself and its business partners to use third party or customs applications, this approach does not allow the set up and dismantling of complex arrangements between business partners. For instance, a first business may wish to allow a second business to access a first set of services, while the second business may wish to provide a second different set of services to the first business.

Additionally, message correlation in EAI or service provider approaches is nonexistent or cumbersome at best. In an end point based EAI, each end point must first agree on message identifiers before sending messages between each so that the related message can be correlated. This process is time consuming and difficult to implement and coordinate among diverse end point users.

In view of the above, improved mechanisms for correlating messages sent between diverse entities in a scalable manner are needed.

SUMMARY

In one embodiment, a method for correlating services within a computer network is disclosed. A message interchange network for exchanging application-level messages between services, which are located outside the message interchange network, is provided. At the message interchange network, a plurality of application-level messages, which each specify which one or more receiving services are to receive the each application-level message, are received. Each received application-level message is forward towards the one or more receiving services. Correlation information regarding each application-level message that is received into message interchange network is retained. The application-level messages are sent between pairs of the services, and the retained correlation information for each application-level message pertains to each application-level message and any other application-level messages related to the each application-level message. A query can then be received, at the message interchange network from a first service, to search the retained correlation information for specific one or more portions of the retained correlation information. A response to the query, which includes the specific one or more portions of the retained correlation information, is sent to the first service.

In a specific implementation, each service is registered at the message interchange network so that each registered service is specified as being accessible by one or more specific services. In a specific aspect, the retained correlation information for each application-level message further includes an indication as to whether the each application-level message has completed transmission. In yet another aspect, the session information for each session includes a Session Identifier (ID) uniquely identifying the each session and the session information for each session further includes an indication as to whether the each session is complete and a reason for the session not being complete if the each session fails to complete. In an alternative embodiment, the query for the retained correlation information is regarding a particular session or call and wherein the specific portions of the retained correlation information that are sent to the first service are related to the particular session or call of the query. In another aspect, it is determined whether the first service is authorized to make the query and specific one or more portions of the retained correlation information are only sent to the first service when it is determined that the first service is authorized.

In another embodiment, a computer system is operable to correlate services within a computer network. The computer system includes one or more processors and one or more memory. At least one of the memory and processors are adapted to provide at least some of the above described method operations. In yet a further embodiment, a computer program product provides correlation of services within a computer network. The computer program product has at least one computer readable medium and computer program instructions stored within at least one of the computer readable product configured to perform at least some of the above described method operations.

These and other features and advantages of some implementations will be presented in more detail in the following specification and the accompanying figures which illustrate by way of example some of the disclosed principles.

BRIEF DESCRIPTION OF THE DRAWINGS

The foregoing and other features and advantages will be apparent from the following, more particular descriptions of some disclosed implementations, as illustrated in the accompanying drawings.

FIG. 4D is illustrates a Message Correlation Table for correlating information regarding each message, a Call Correlation Table for correlating information regarding each call, and a Session Correlation Table for correlating information regarding each session, in accordance with some implementations.

DETAILED DESCRIPTION OF SPECIFIC EMBODIMENTS

Reference will now be made in detail to some specific implementations. An example of this embodiment is illustrated in the accompanying drawings. While some features will be described in conjunction with these specific implementations, it will be understood that it is not intended to limit the invention. On the contrary, it is intended to cover alternatives, modifications, and equivalents as may be included within the spirit and scope of the appended claims. In the following description, numerous specific details are set forth in order to provide a thorough understanding. Some implementations may be practiced without some or all of these specific details. In other instances, well known process operations have not been described in detail in order not to unnecessarily obscure the disclosed implementations.

In accordance with the present disclosure, the interchange of enterprise data is supported through an open platform for enterprise application integration (EAI). This open platform overlays a public network (e.g., the Internet) and does not require business entities to heavily invest in specialized software and resources. As will be described in greater detail below, the provision of extra-enterprise application integration as a service is provided. This service facilitates EAI efficiently and affordably to the businesses that need it the most (i.e., the small- and medium-sized enterprise (SME) market). More generally, the open platform can be used to support services provided by business-to-business (B2B) enablers, system integrators, and other node enablers.

Figure 1:
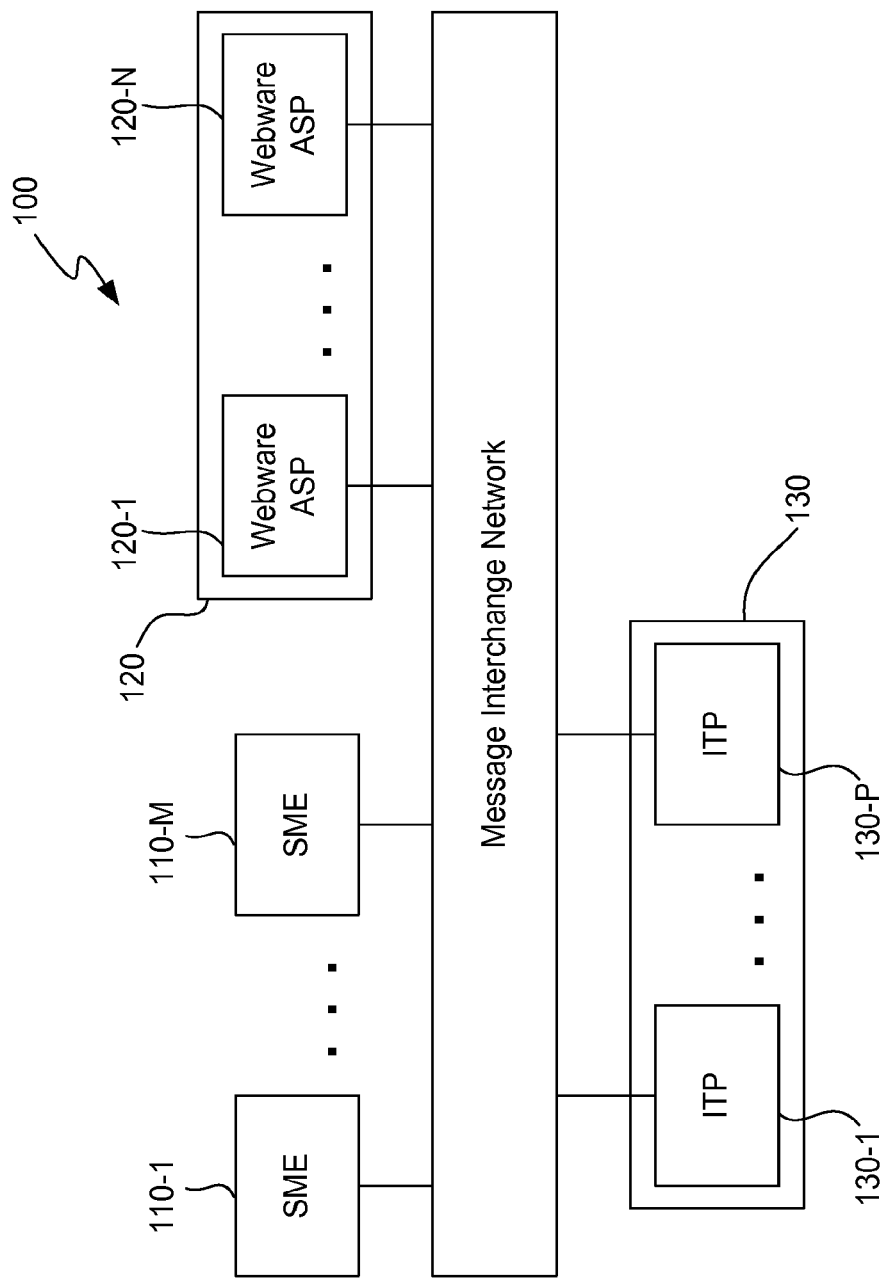
FIG. 1 illustrates a message exchange network in accordance with some implementations.

FIG. 1 illustrates a high-level overview of a message interchange system 100. Message interchange system 100 includes a Message Interchange Network 150 that enables SMEs 110-$m$, webware ASPs 120-$n$, and in-transit processors (ITPs) 130-$p$ to connect to one another, integrate business processes and applications, and exchange data for mission-critical business functions. In general, ITPs 130-$p$ are operative to process messages that are in-transit from a sender to a recipient. ITPs 130-$p$ can be designed to perform a variety of functions such as data transformation, enrichment, cross-reference ID mapping, filtering, credit scoring, or the like.

A directory (not shown) includes a list of all SMEs 110-$m$, webware ASPs 120-$n$ and ITPs 130-$p$ that can be accessed via Message Interchange Network 150. Only publicly available services (i.e., those services that organizations register as accessible by any user of the network) are viewable in the directory.

In general, all applications that are connected to Message Interchange Network 150 can be referred to as a service. In the illustrated embodiment of FIG. 1, applications owned by SMEs 110-$m$, webware ASPs 120-$n$ and ITPs 130-$p$ can each be referred to as services. Each service is owned by an organization, and an organization can have any number of services connected to Message Interface Network 150. The message exchange within Message Interface Network 150 is therefore between services.

In one embodiment, services that receive messages can take a set of arguments that further define the intended action the service will perform on a received message. For example, a service may receive the name of an operation, or may permit configuration parameters. In this environment, the service would provide a means (e.g., through a URL to documentation) for message composers to know about arguments accepted by the particular service. The message composer can then include selected arguments as a part of the service declaration in a message.

As described, services registered with Message Interface Network 150 represent applications that send or receive messages. An organization may, however, wish to create virtual services which act as proxies to other services. For example, a business X may have a relationship with business Y such that messages sent to business X's service are redirected to business Y's service. Services can implement redirection through routing scripts that map invocations of the service to invocations of another service, including redirection of replies.

For each service registered by an organization with Message Interface Network 150, there are a number of properties and permissions that can be associated with the service. Examples include a unique service identifier, authentication information, mode of message delivery, windows of time during which messages are accepted, URL address of service, permission to invoke other services to act on a message, and rules that modify the invocation of services. These properties and permissions affect the routing of messages from or to the service.

Figure 2:
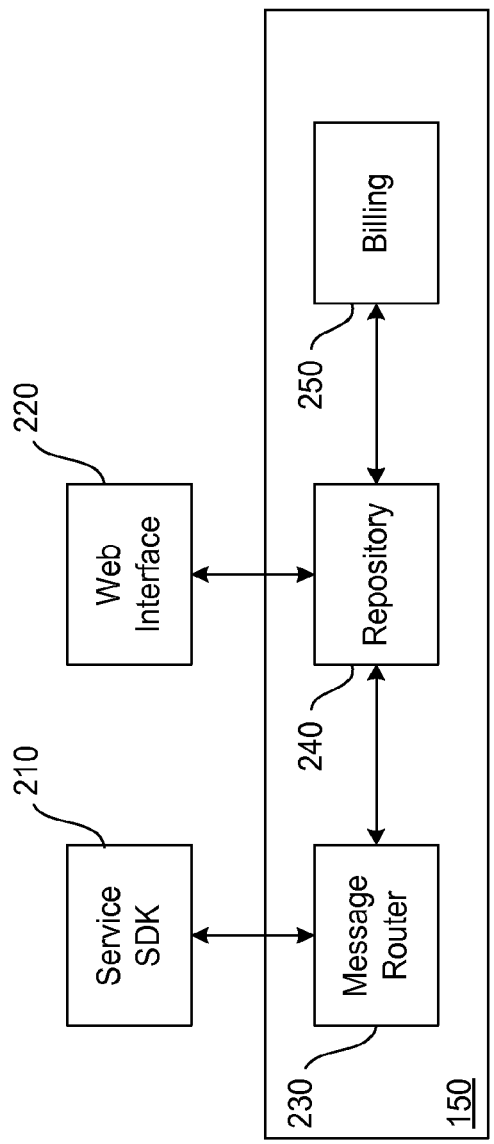
FIG. 2 illustrates components in a message exchange network in accordance with some implementations.

FIG. 2 illustrates the primary functional components that operate within message interchange system 100. The five primary functional components include service software development kit (SDK) component 210, web interface component 220, message router component 230, repository component 240, and billing component 250.

SDK component 210 serves as a foundation for supported development of client applications that interface with Message Interface Network 150. Owning organizations can use SDK component 210 for custom integration with their software applications. As would be appreciated, SDK component 210 is not required to enable a service to access Message Interface Network 150. A service can use any development tool or process that would enable the service to leverage the application programming interface (API) that is supported by message router component 230.

In general, SDK component 210 enables the provision of an interface that would be available on most common platforms, and in most popular languages. In this manner, SDK component 210 abstracts away the complex technical requirements of transferring messages using Message Interface Network 150.

SDK component 210 need not have any business logic built into it. SDK component 210 can be used to develop plug-ins to shrink-wrapped applications, thereby greatly reducing development time. As would be appreciated, SDK component 210 can provide convenient libraries and utilities that a service may optionally use to facilitate the (1) creation and reading of messages conforming to the message router component API, and (2) authentication of users of Message Interface Network 150.

Repository component 240 is the primary database of Message Interface Network 150. Repository component 240 includes information on customer profiles, message logs, and directories. As will be described in greater detail below, message router component 230 uses repository component 240 to retrieve customer and application information that affects message routing. Message router component 230 also writes message log information to repository component 240 about messages that are processed through Message Interface Network 150.

Billing component 250 uses the message log information in repository component 240 to derive actual usage of Message Interface Network 150 by customers, and handles the invoicing and payment collection from customers. In one embodiment, the billing within message interchange system 100 can be based upon actual customer usage of Message Interface Network 150. For example, billing component 250 can charge customers based on a per transaction basis. In one embodiment, the per-transaction cost is based on the size of the messages being processed. As would be appreciated, these per transaction costs can be assessed to parties in a variety of ways. For example, the costs can be assessed against the originator of the message, the intermediate services, the recipient of the message, or any combination of those parties. This billing flexibility is in sharp contrast to conventional EAI solutions that generate revenue through software license fees.

Web interface component 220 is the front-end component of Message Interface Network 150. Web interface component 220 interfaces directly with users by enabling login, registration, account maintenance, directory lookup, rules configuration, reporting, billing, and customer support functionality. The web interface provides online forms for data entry and can perform preliminary validations on the data. Through web interface component 220, the user can also perform queries against repository component 240 for directory lookups or reporting.

In one implementation, Message Interface Network 150 is an open network architecture that not only facilitates the easy introduction of services into the network, but also enables businesses to access a robust suite of services via one connection to the Message Interface Network 150.

As noted, message router component 230 provides the core function of message routing and delivery within Message Interface Network 150. In one embodiment, message router component 230 is implemented as an Internet-based message exchange service that provides a transport level messaging service. In other words, message router component 230 need not be aware of the application semantics of a message exchange.

Preferably, Message Interface Network 150 need not inherently provide business process modeling. This is in contrast to conventional EAI solutions that may require a continual traversal up and down a protocol stack in routing a message from a sending service to a recipient service. For example, if the protocol stack included transport, routing, transformation, and work flow layers, then each message exchange segment may require analysis and processing at each layer to determine the next service (intermediate or final) that should receive the message.

As noted, services can post messages to and retrieve messages from message router component 230 using an API. This provision of a standardized interface enables parties to easily connect to and use Message Interface Network 150 without being restricted in the type of message content.

In one embodiment, the protocol for posting and retrieving messages with Message Interface Network 150 is the Simple Object Access Protocol (SOAP). The SOAP messaging protocol defines a mechanism to pass commands and parameters between HTTP clients and servers. Through this standard object invocation protocol, HTTP is used for transport and XML is used for data encoding. The SOAP messaging protocol does not rely on the use of particular operating systems, programming languages, or object models on either the server side or the client side. As would be appreciated, other protocols can also be supported by Message Interface Network 150.

While the message header can use extensible markup language (XML) syntax, the message body can accommodate any type of data, whether it be text or binary, encrypted or unencrypted. If the message body is also in XML form, then the message body can opt to use a schema based on an industry standard such as ebXML, BizTalk, RosettaNet, OAGIS, or any other suitable standard.

In one embodiment, message exchange through Message Interface Network 150 is asynchronous. Recipient services can be configured to poll Message Interface Network 150 for incoming messages, or, if they have their own server, can have Message Interface Network 150 push messages to them.

After a sending service posts a message to Message Interface Network 150, one or more in-transit services 130-*p* can operate on the message before it reaches the recipient service. In-transit services can perform useful operations on messages, such as data transformation, enrichment, cross-reference ID mapping, filtering, credit scoring, or the like. Through the standardized interface, in-transit services 130-*p* can independently join the Message Interface Network 150 and operate on messages. This flexibility encourages independent third parties to build services that can be plugged into Message Interface Network 150. Such an open network would encourage third parties to market a data service that generates revenue based upon the level of utilization of the service.

As noted, in-transit services can be included in a message path that begins at a sending service and terminates at a recipient service. As will be described in greater detail below, sending services can explicitly specify a set of services to operate on a given message. In addition, recipient services can specify services that should operate on messages before delivery to the recipient service. In one example, a recipient may always want messages to pass through a filtering service to screen out messages from unknown senders.

Messaging through Message Interface Network 150 can be as secure as the participants desire. Each service registered with Message Interface Network 150 can specify a security policy declaring encryption and authentication levels for Message Interface Network 150 to enforce. For messages that flow through in-transit services, a sender can also specify the permissions for each in-transit service to access or operate on parts of the message.

In one embodiment, Message Interface Network 150 uses the secure HTTPS protocol to support secure transport connections when a service posts a message or polls for messages, and when Message Interface Network 150 pushes messages to a client server. Authentication can be based on either username/password or certificates.

SSL encryption as part of HTTP can be used to provide data protection during message transmission over the public Internet. In general, this level of protection is sufficient for most situations. Services can, however, perform their own extra encryption of message documents to keep them private even from Message Interface Network 150. Services that add extra encryption can ensure, however, that all services that operate on the message documents have the necessary keys to decrypt the documents.

As is well known, the authentication protocol of SSL includes a server's presentation of a certificate to clients. Accordingly, Message Interface Network 150 presents a server certificate to services that connect for posting or polling. The connecting service has the option of then providing either a username/password or certificate for Message Interface Network 150 to authenticate the service. The form of client authentication is a configuration option within the profile Message Interface Network 150 maintains for each service.

When Message Interface Network 150 pushes messages to a service, the service's server can present a server certificate to Message Interface Network 150 for authentication of the service. For the reverse authentication, the service can then require either a username/password or certificate from Message Interface Network 150. Again, that option can be configured in the profile information Message Interface Network 150 maintains for the service.

As a message flows through a selection of services on the way to the recipient service, and as the recipient service's response returns to the sending service, Message Interface Network 150 maintains an audit trail of all operations on the message and all services that touched the message. The audit trail serves several purposes. First, it enables Message Interface Network 150 to reconstruct the message history in the case of queries on the message trail. Second, it allows Message Interface Network 150 to compile a usage report for any service for reporting and billing purposes.

Figure 3:
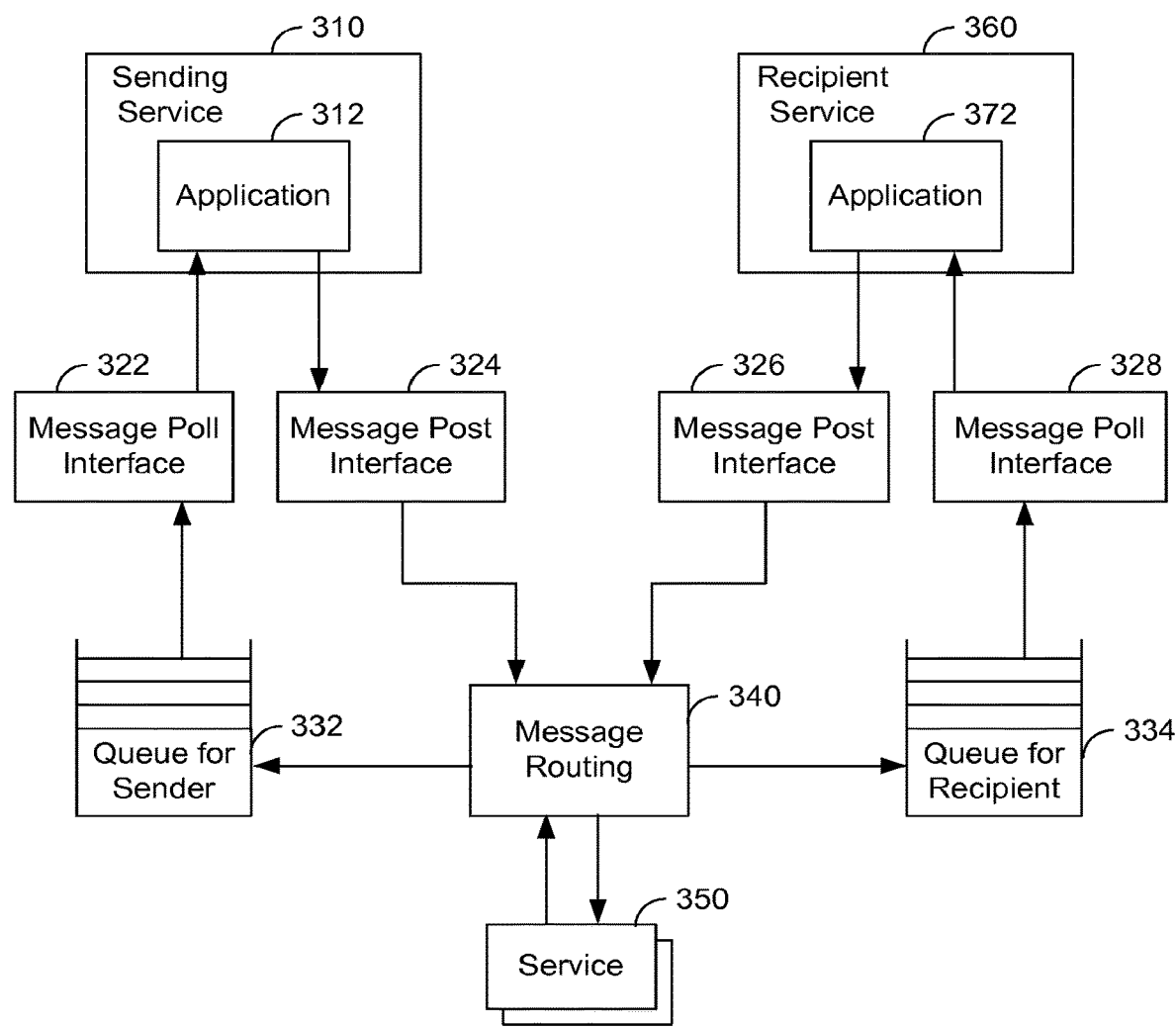
FIG. 3 illustrates a request response pattern example.

Having described the general framework of Message Interface Network 150, a more detailed description of a message transaction lifecycle within Message Interface Network 150 is provided with reference to FIG. 3.

In this framework, a message can be embodied as a self-contained collection of information to serve a particular purpose, such as a request, a response, a notification, or an acknowledgement. As noted, Message Interface Network 150 can generally be agnostic about the content of a message other than header information that affects routing of the message.

In one embodiment, request, response, and notification messages can be defined. A request message expects a subsequent response message from the recipient(s) to be returned to the sender. Request messages may represent inquiries, but might also represent update requests that only expect a return status response. If an error occurs in routing a request message, Message Interface Network 150 returns an error response message to the sender.

A response message is issued by a recipient of a request message. The response message references the original request message. Failure of the response message may result in an error response message being returned to the sender of the original request message.

A notification message is a one-way message. No response to the notification message is expected back to the sender. Message interchange network 150 can regard any response message referencing a notification message as an invalid message. If a notification message fails, no error message is returned to the sender.

As would be appreciated, further messages can be defined for Message Interface Network 150. For example, a cancel message can also be defined, wherein the cancel message is used by the sender to cancel a previous message.

The operation of these messages is now described with reference to the request/response illustration of FIG. 3. This illustration demonstrates a typical example of a sending service 310, such as an enterprise, making an inquiry to a recipient service 360, such as a webware provider. In one embodiment, a sender's application 312 that connects to Message Interface Network 150 is a desktop application. In another embodiment, a sender's application 312 that connects to Message Interface Network 150 is an enterprise server, or an EAI package.

The first step in the message transaction process is the creation of a message. In one embodiment, a sender formats the messages to conform to an XML schema for messages. This XML schema prescribes the format for message headers while allowing any kind of data to be included in the message body (or payload). As part of message construction, sending service 310 specifies the recipient service(s) 360 of the message. In one embodiment, a recipient service's name includes an organization and a specific service provided by that organization. The service name can be generally represented in the message via a globally unique ID.

The actual set of elements contained in a message depend on whether the message is being posted or delivered. In one embodiment, a message includes a header element, a body element and/or attachments. In one embodiment, the attachments are based on multi-part Multipurpose Internet Mail Extensions (MIME).

An embodiment of a message includes header and body elements. As would be appreciated, the actual message format can differ depending on the protocol. In particular, protocols other than the SOAP protocol can be used. The header element may include routing and invocation information. The header as posted by a sending service may often be modified by Message Interface Network 150 for delivery to the receiving service.

The body element may include the documents the sender is sending to the recipient(s). These documents can also be operated upon by one or more services. The documents can be in the form of XML or any other representation, including text, binary, etc. In one embodiment, all or part of the documents that are being sent are included in an attachment to the message.

While messages preferably have a similar overall structure, the actual composition of elements can differ between the various message types and between messages as posted and as delivered. For example, some elements in a sent message can be changed or not be included in the message as delivered, such as elements particular to constructing a route. Some elements can also be inserted only in the message as delivered, such as identifier elements.

If the sending service wishes to have the message routed through any services before delivery to the recipient service (s), the sending service can specify an explicit sequence of services that should operate on the message. The sender can also implicitly include services in the route for a message through the specification of routing scripts associated with the defining service. Routing scripts are described in greater detail below.

After a message is constructed, the message is posted to Message Interface Network 150. FIG. 3 illustrates an example posting of a message by application 312 to message post interface 324. As noted, in one embodiment, the posting of a message is performed using the SOAP messaging protocol.

If sending service 310 posts a message that does not have well-formed XML, the message posting is rejected and an error response is returned. In general, messages can be rejected for a variety of other reasons. For example, a message can be rejected if the service indicated in the message header as the sender is not the same as the actual sender of the message, the message is a duplicate posting of a previous message, a service attempts to reply to a message for which it was not a recipient, or a response message does not reference a prior message.

In one embodiment, each message posted by a service can have a unique handle assigned by the service to identify the message. This unique handle can be used to provide a means for Message Interface Network 150 to detect duplicate postings of the same message. Duplicate postings can occur in the case of failure recovery by the service. In one embodiment, if a service specifies that Message Interface Network 150 should reject duplicate postings of a message, then the service could provide unique handles for messages and set a "potential duplicate" flag in messages that may be a duplicate posting. Regardless of whether or not a service provides a unique handle for a message, Message Interface Network 150 can assign a globally unique session identifier to each posted message.

After a message is posted, Message Interface Network 150 routes the message to the recipient service(s) 360. The routing of the message is based upon a route calculation by Message Interface Network 150. The calculated route includes all intermediary services 350 that are scheduled to operate on the message en route to recipient service(s) 360. The calculated route can be based on routing instructions specified explicitly in the message header and/or on routing scripts pre-defined by the sending service 310, recipient service 360, or any in-transit services 350 that have been included within the calculated route.

In general, routing scripts define a procedure for enabling determination of at least part of a route. This procedure can be based on any type of criteria. For example, a procedure can be defined that determines a next destination of a message based on the existence of one or more attributes of the message. In another example, a procedure can be defined that effects a determination based on the comparison of one or more attributes of the message to a reference value. In yet another example, a procedure can be defined that effects a determination based on pattern matching (e.g., regular expression matching). As would be appreciated, routing scripts can embody any of a variety of criteria-based procedures.

Routing scripts can specify a sequence of services that operate on either inbound or outbound messages for a service. As noted, in-transit services may themselves have routing scripts requiring processing by other services. Therefore, the route calculation can be recursively defined based upon routing scripts specified by all services that interact with the message.

In one example, the sending service 310 may specify a routing script that requires a cross-reference mapping service to be included in the calculated route whenever sending service 310 sends a message to recipient service 360. In another example, recipient service 360 may specify a routing script that requires that any incoming request messages must first pass through a filter service to block messages from a list of sending services 310.

Routing scripts enable sending services to include services into the message route without having to explicitly specify the services in the message itself. Also, routing scripts enable recipient services 360 to require services 350 to be in the calculated route, regardless of the sending service's route specification.

In one embodiment, a routing script is embodied as a routing rule. A routing rule includes two parts: a condition and one or more resultant actions. The conditional part of a rule can be based on any elements or element attributes in a message's header. Additionally, content-based routing can be supported through conditional rules based on attributes of an element in a message's body and/or attachments.

Every rule generally has at least one condition. Conditions include an operator and zero or more operands. Example operators include equals, notEquals equalsOneOf, lessThan, greaterThan, and exists operators. In one embodiment, operators act on XML elements, XML attributes, or on other conditions.

From the standpoint of the element operators, XML elements contain either child elements or character data. Therefore, the operands for an element comparison both represent the same type of content: either elements or character data. Character data can be in the form of a string, number, or date. Conditions involving elements that do not appear in the message will evaluate to false.

Attributes generally have a type of character data, which can be string, number, or date. Many attributes are implicitly included in an XML document with default values. Therefore, an attribute identified in a condition can refer to either an explicit or implicit attribute. Conditions involving optional attributes that do not appear in the message will evaluate to false.

The usual boolean operators can combine conditions into more complex conditions. Condition operators act on other conditions. Example condition operators include AND, OR, XOR, and NOT condition operators.

The result of satisfying a rule's conditions is that an action will be triggered to modify the route for a message. Probably the most common result of a rule is to add one or more services into the route for a message. Several rule actions can be defined, and several are described further in the above reference Lev Brouk et al. U.S. patent application.

A service can maintain an evaluation sequence for the scripts associated with each role that the service can have with respect to a message. That sequence determines the order in which the scripts for that service are applied.

In one embodiment, scripts are evaluated in the following order: (1) scripts for the sender of the message; (2) scripts for services included by the scripts for the sender (this is recursive); (3) scripts for the recipients of the message, in the order of recipients in the message header; and (4) scripts for services included by scripts for the recipients (this is recursive).

When multiple scripts for a service include services into a route, the order of services in the route will follow the order of the scripts. That is, if script 1 inserts service A, and script 2 inserts service B, and if script 1 is evaluated before script 2, then service B follows service A in the route.

In one embodiment, routing scripts are evaluated only once during the initial calculation of the route for a message. The message header contains the basic information to initially construct a route, such as sending service 310 and recipient services 360. The message can also contain an explicit specification of a set of services to include in the route. Once the route is constructed from the header information, routing scripts are applied to further elaborate the route.

In an alternative embodiment, at least part of the message route is calculated after the physical routing of the message has begun. Dynamic routing is described in greater detail below in the context of physical and logical routing.

At the transport level, Message Interface Network 150 routes a message to a service by delivering the message through the Internet to a physical machine on which the service resides. That service operates on the message and, if the message is a request, returns a response message back through the Internet to Message Interface Network 150. The sequence of message deliveries and responses between Message Interface Network 150 and services represents the physical routing of a message.

Message interchange network 150 also provides a mechanism for a service to act on a message without the message being physically delivered to the service over the Internet. This mechanism is enabled through the logical routing of the message to the service. With logical routing, a service can modify the routing of the message or modify the context of the message for delivery to the next service. Significantly, a service can be logically included in a message routing, without being included as part of the physical routing of the message.

In one embodiment, logical routing of messages is implemented through the specification of routing scripts. As described above, a service can define one or more routing scripts. These defined routing scripts are stored within Message Interface Network 150 and are processed to determine what routing behavior should occur when a message is logically routed to the service.

Logical routing can take place statically or dynamically. With static logical routing, a message is logically routed to all services prior to any physical routing. In other words, Message Interface Network 150 logically routes the message to all services prior to the physical delivery of a message to any services. This logical routing is represented by the sequential evaluation of the routing scripts that are defined by those services. As noted above, in one embodiment, the routing scripts are evaluated in the following order: (1) scripts for the sender, (2) scripts for the services included by the sender (recursive), (3) scripts for the recipient, and (4) scripts for the services included by the recipient (recursive).

In dynamic logical routing, the logical routing is not completed prior to the start of the physical routing. Rather, the logical routing takes place in sequence with the physical routing of the message. The relation between logical routing and physical routing is described in greater detail below.

As noted, Message Interface Network 150 delivers a message logically to every service participating in a message's routing. Of those services, some subset will also accept physical delivery of the message.

To illustrate this concept, consider an example where service A includes service B into the message route. Service A can include service B into the route either prior to itself in the route (provided service A is not the originator of the message) or after itself in the route. In either case, Message Interface Network 150 would logically route the message first to service A, which includes service B into the route. Message interchange network 150 then logically routes the message to service B, and after service B produces a response, Message Interface Network 150 logically returns the response to service A. The point at which service A physically receives the message depends on whether service A included service B prior or after itself in the route. If service A includes service B prior to itself in the route, then the order of physical delivery is first to service B then to service A. Conversely, if service A includes service B after itself into the route, then the order of physical delivery is first to service A then to service B. In the latter case, the response from B is not necessarily physically delivered back to service A. Rather, it may be only logically delivered back to service A.

Services to which a message is logically routed do not necessarily have to also physically receive the message. In the above example, service A could have been logically routed, with physical delivery only to service B. Consider the following scenario. Suppose service X includes service A into the route and service A includes service B into the route. The logical routing of the message would proceed from service X to service A to service B back to service A back to service X. Service A can choose not to be included into the route for physical delivery, in which case the physical routing of the message is from service X to service B.

In general, the act of routing a message (physically or logically) to a service can be thought of as an invocation of the service. When a service includes another service into the route of a message, the including service is effectively invoking the included service. The invocation of a service does not necessarily imply the physical delivery of information to the invoked service. The logical routing of a message is then the logical invocation of services. A route that includes a progression of services including other services can effectively be modeled as a progression of invocations.

In logical routing, each service is not only able to manage the inclusion of other services into the route but is also able to manage the context of those inclusions. From the standpoint of invocations, an invoking service is able to set the context for the invocation. An invoked service can also set the context of its return.

Message interchange network 150 can also affect context management on behalf of invoking services. As noted, while an invoking service can be logically included in a message routing, it need not be included as part of the physical routing of the message. In general, Message Interface Network 150 can persistently store contexts of a message, thereby enabling proper restoration of contexts upon return from an invocation. Several embodiments of context management are described in the above referenced Lev Brouk et al. U.S. patent application.

Having touched on a framework for logical routing and invocation of services, the description of the physical routing process is continued with reference to FIG. 3. In this example, it is assumed that static logical routing has produced a route for the message.

After deriving the route for a message, Message Interface Network 150 validates the route. There are numerous conditions that can cause a route to be invalid. For example, there may be routing permission violations or a service may be currently disallowed by Message Interface Network 150 due to, for example, the non-payment of usage bills.

If the route is determined to be invalid, then Message Interface Network 150 rejects the posted message and may return an error to the sending service 310 either in the response to the posting call or in an error message.

Message interchange network 150 routes the message to all services in the calculated route. In the event of failure at any stage in the routing, Message Interface Network 150 aborts the message routing and, if the original message was a request, returns an error message back to sending service 310. For messages with multiple recipients, an error in the routing to one recipient will not necessarily affect routing to other recipients. Errors during routing can occur due to several circumstances. For example, a message may fail to reach a recipient within the expiration time for the message, a service may fail to return a reply to a delivered message, or a service may return an error status for a message.

Message Interface Network 150 sequentially delivers a message to each service identified in the message route. In FIG. 3, this process is illustrated as a flow of the posted message through message routing element 340, and on to one or more services 350. In one embodiment, Message Interface Network 150 includes all of the message documents in the message delivered to service 350, even if service 350 only expects to operate on one document or documents of a particular content-type. Service 350 would ignore documents that it does not expect.

As noted, Message Interface Network 150 invokes in-transit services in the same way as delivering a message to any sending or recipient service. In general, a service does not necessarily need to be aware whether it is being invoked as an in-transit service or as a recipient service.

After processing the message, service 350 sends the results in a response message back to Message Interface Network 150. If service 350 is unable to produce a valid result for its operation on a message, then service 350 may return an error code in its response message to Message Interface Network 150. If service 350 fails to respond to a received message, the message will ultimately expire, and Message Interface Network 150 may return an error message back to the sending service 310.

Upon receipt of the response message from service 350, Message Interface Network 150 then routes the message to the next destination (e.g., another service 350) on the routing list. After passing through each of the intermediate destinations on the routing list, the message is then stored in queue 334 for recipient service 360. Queues can also be associated with in-transit services 350. For simplicity, these queues are not shown in the illustrated embodiment of FIG. 3.

Application 372 in recipient service 360 can retrieve the message from queue 334 via message poll interface 328. In the poll mode, application 372 periodically issues a call to message poll interface 328 to ask for any waiting messages. If there are queued messages waiting for delivery to that service, then the one or more messages are returned in a reply. When making poll requests, a service can provide selectors on the messages to fetch. For example, a service can retrieve messages based upon the sender, message type, topic, etc.

In an alternative embodiment, message delivery is enabled through a push mode. In the push mode, the recipient would have its own server to which Message Interface Network 150 can send messages. A service can specify a maximum number of tries, as well as the retry interval, for Message Interface Network 150 to send the message to the service before aborting pushed delivery. A service to which Message Interface Network 150 pushes messages can also optionally poll for messages.

In the push mode, a service can also specify a delivery window in which it will accept pushed messages. For example, a service might only accept messages between the hours of 1 AM and 2 AM.

As further illustrated in FIG. 3, a response message can be posted by recipient service 360 to message post interface 326. The message is then routed through one or more services 350 prior to being stored in message queue 332. The message can then be retrieved by sending service 310 through message poll interface 322. As noted, the return path would not necessarily match the forward path.

In one embodiment, the sender of a message can specify a time by which the routing of a message must complete. If that expiration time passes before delivery of the message to it final destination, Message Interface Network 150 will abort further routing of the message. In one embodiment, the final destination for a request message is the delivery of a response message back to the original request sender. In this embodiment, senders of response messages cannot specify an expiration since the response is considered part of the routing of the original request message. If a request message expires, Message Interface Network 150 will return an error response back to the sender. If the sender does not specify an expiration time, then a default message expiration time (e.g., 48 hours) can be used. Message expiration is not the same as document expiration. Document expiration is associated with a specific document and indicates how long the document's information is valid.

As part of the message delivery process, Message Interface Network 150 logs all posted messages, including invalid messages. For each message, Message Interface Network 150 logs relevant information to track the history of the message. Message Interface Network 150 also maintains a correlation between messages. That is, for request messages, Message Interface Network 150 associates the log of the response message(s) with the log of the request message.

In one embodiment, logged information can include the message header, the calculated route for the message (unless route calculation fails), the status of route validation, the size of the message at each stage of the route, and the routing history, including the status for each service along the message's route. The status values for each service depends on the role of the service.

Message Interface Network 150 correlates all messages for the same message transaction. That is, for request messages, Message Interface Network 150 associates the log of the response message(s) with the log of the request message. Similarly, if a message causes an error message, then Message Interface Network 150 associates the log of the generated error message with the log of the original message.

Figure 4A:
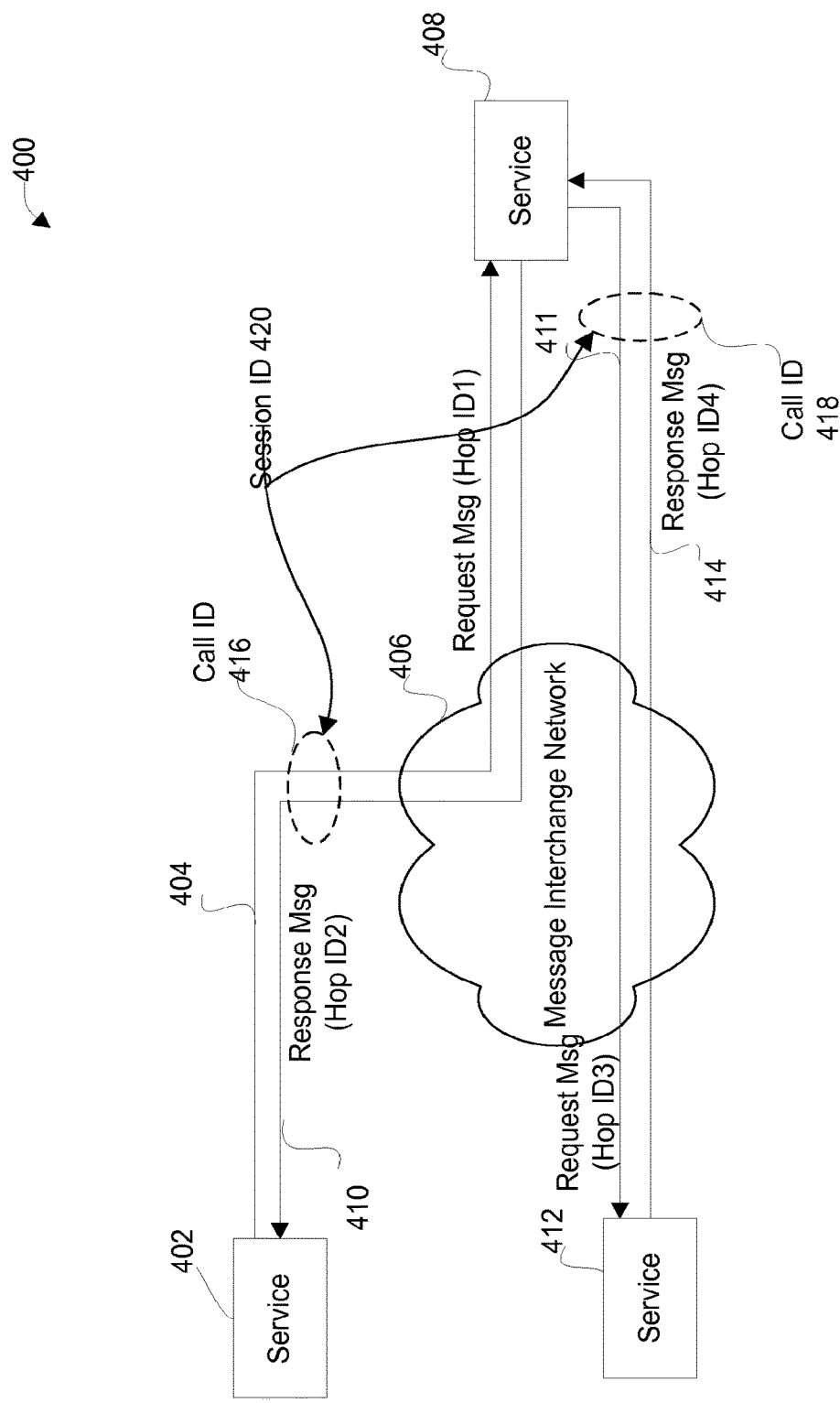
FIG. 4A is a diagrammatic representation of a communication exchange between a plurality of services in accordance with some implementations.

FIG. 4A is a diagrammatic representation of a communication exchange 400 between a plurality of services. In general, any type of service may exchange messages with any other type of service through Message Interchange Network which operates to correlate such messages. As shown in FIG. 4A, a service 402 initially sends a request message 404 through Message Interchange Network 406 to Service 408. Service 408 sends a response message 410 back to Service 402 in reply to the request 404. Service 408 also sends a request message 411 to Service 412 in response to the original request message 404 from Service 402. Service 412 then sends a response message 414 back to Service 408 in reply to the request 411.

A service may represent any computer application or device accessible to other entities through an interface such as an application programming interface (API), user interface, or Internet web user interface, by any of a variety of protocols over a network within an entity or over the public Internet. A service may also be comprised of multiple methods or applications implemented on a single device or distributed across multiple devices.

In particular cases, a message may also be sent to a routing script, as described above. In a correlation implementation, a routing script can also be defined as a service. For example, an application type service may send a message to a routing script type service. Accordingly, routing programs can be session participants. In fact, one of the major uses of sessions may be that a session encompasses the set of calls into and from a routing script.

The messages in this communication exchange 400 are all related and are preferably correlated together. Response message 410 is in reply to request message 404, and hence, related to request message 404. Likewise, response message 414 is in reply to request 411, and hence, related to request message 411. These two pairs of messages may each be referred to as a call. As shown, request 404 and response 410 form a call, while request 411 and response 414 form a call.

In one embodiment, each message is given a Hop Identifier (ID) and each call is given a Call ID. As shown, request 404 and response 410 are given Call ID 416, and request 411 and response 414 are given Call ID 418. In this example, the messages belonging to Call ID 416 are also related to the messages belonging to Call ID 418 since the latter messages were initiated in response to the former messages. Hence, the messages associated with both Call ID 416 and 418 are given a Session ID 420. In sum, each message is given a Hop ID, each set of related messages exchanged between two services is given a Call ID, and each set of messages belonging to related calls are given a Session ID.

Figure 4B:
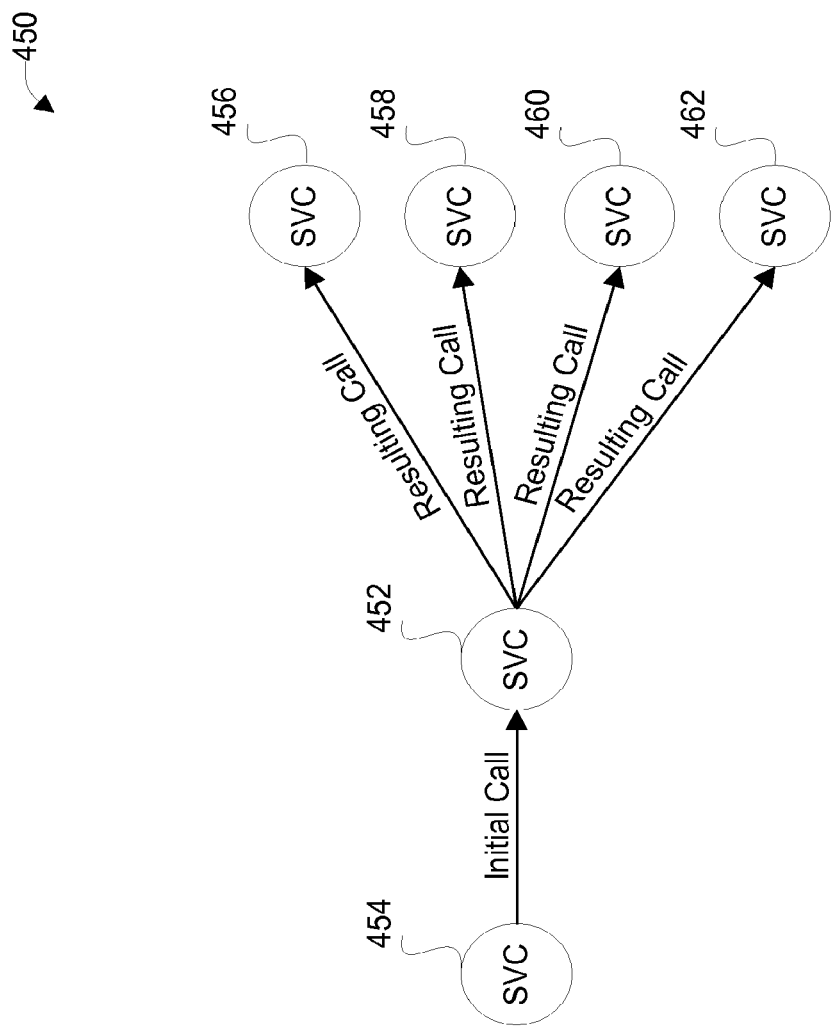
FIG. 4B illustrates a group of related messages within another example communication exchange in accordance with some implementations.

FIG. 4B illustrates a group of related messages within another example communication exchange 450. As shown, a first service 454 initiates a call between itself and service 452. In response to this initial call, service 452 then has a plurality of resulting calls between itself and a plurality of services 456, 458, 460, and 462. As illustrated, a first invocation to a service may initiate the invocation of a second service. As described above, the invocations can be recursive and rather complex and are only limited to the computational and storage resources of the Message Interchange Network 406.

In this example, the messages of these related calls all have the same assigned unique Session ID. Similarly, each call has a unique Call ID, while each message within each call has a unique Hop ID. However, not all calls initiated by a particular service have to be part of the same session. For example, service 452 can choose that some of the resulting calls are not part of the same session. In one implementation, a call is a predefined set of messages (e.g., as preconfigured in the Message Interchange Network), such as a notification message or a pair of request and response messages. A call may be predefined as any number and type of messages. A session in this implementation depends on how the particular services define sessions. That is, a service may be implemented to define its messages any suitable manner. For example, a service may send a first message with the intention of the message being part of a first session and send a second message with the intention of the message being part of a second session. In this example, the sending service may include a first Session ID in the first message and a second Session ID in the second message. Alternatively, the Message Interchange Network may predefine what constitutes a session. For instance, messages which are spawned from a service in response to a message received into such service may be defined as part of a same session.

In summary, a call may include any predefined number and type of messages. For instance, each call may include any number of request and response messages and/or any number of notification messages (e.g., a response is not sent by the receiving service). Each session may include any number of calls between any number of service pairs. While the definition of sessions is general, common uses of sessions include grouping calls comprising a conversation between services, comprising a transaction involving multiple services, or comprising a trace of routing a message through diverse services.

A same message may be passed through any number of services or hops. That is, a particular message may result in multiple Hop ID's, one Hop ID for each hop of its route. A same message may also be modified by such services as it passes through such services. A message which enters a service, is modified by such service, and output from such service may be defined as two different messages: a first message which is received by such service and a second modified message which exits the service.

Figure 4C:
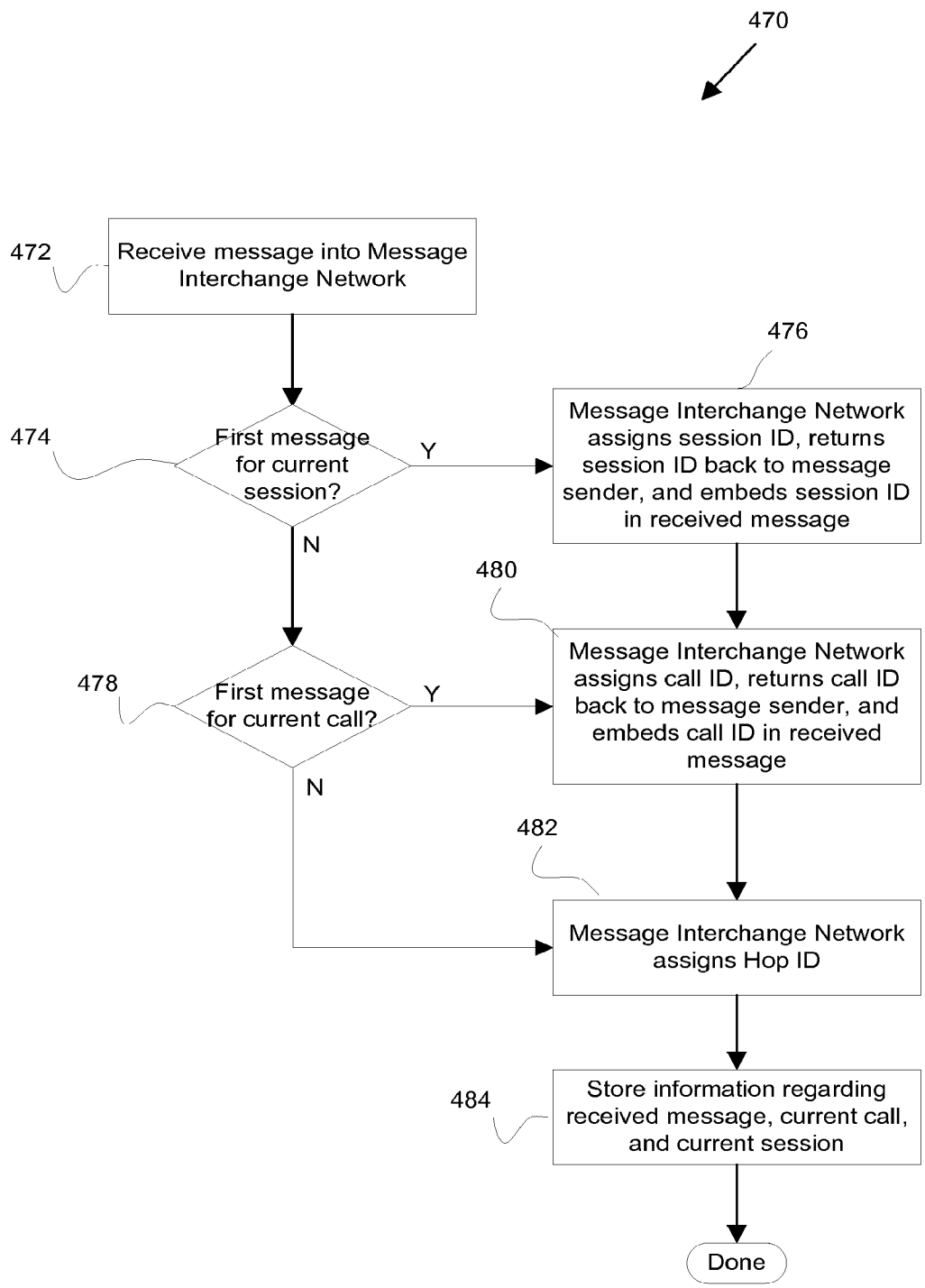
FIG. 4C is a flowchart illustrating a procedure for correlating messages in accordance with some implementations.

Any suitable technique may used to correlate related messages. FIG. 4C is a flowchart illustrating a procedure 470 for correlating messages. Initially, a message is received into Message Interchange Network 406 in operation 472. The message may be any form, such as a request, response, or notification message. Any of these three message types can also include error messages, alert messages, cancel messages, acknowledge messages, etc.

It is then determined whether this is the first message for the current session in operation 474. In other words, it is determined whether the received message is the start of a new session. This determination may be performed in any suitable manner. In one implementation, if the received message does not include a Session ID or a Call ID, then it is determined that it is the first message in the session (e.g., that this is the start of a new session). The Message Interchange Network 406 then assigns a unique session ID for the current session in operation 476. The Message Interchange Network 406 may also return the assigned Session ID to the sender of the message and embeds the Session ID in the received message before forwarding the message to the recipient service in operation 476. When the received message is not the first message in the current session, assignment of a new Session ID is skipped.

If the message is not the first message in the current session, a Session ID may still be returned back to the message sender in an alternative implementation, as well as storing information about the message. In either implementation, a new Session ID is not assigned, but rather the Session ID of the current session is used for correlating with the current message.

Messages which are sent by either the sender service or the receiver service after the first message will include the either the assigned Session ID or Call ID if they belong to the current session. A message which is in reply to a request message may simply include a Call ID which is the same as the Call ID of the corresponding request message. In this case, the response message does not include a Session ID and the Message Interchange Network 406 determines that the response message belongs to the session to which the Call ID is associated.

It may then be determined whether the received message is the first message in the current call in operation 478. In one example, if the message already includes a Call ID, then it is determined that the message is not the first message for such call. If the message does not include a Call ID, then it is determined that this is the first message for the current call and the Message Interchange Network 406 then assigns a Call ID in operation 480. The Call ID may also be returned to the message sender and embedded in the received message in operation 480. If it is determined that this message is not the first message for the current call, then this operation 480 for assigning a new Call ID is skipped.

If the message is not the first message in the current call, a Call ID may still be returned back to the message sender in an alternative implementation, as well as storing information about the message. In either implementation, a new Call ID is not assigned, but rather the Call ID of the current call is used for correlating with the current message.

This Call ID assignment operation 480 is also performed after the Session ID assignment operation 476, where a determination is not made as to whether the message is the first message in the current call. When it is determined that the message is the first message for the current session, it is also assumed that it is the first message for the current call.

The Message Interchange Network 406 may then assign a Hop ID to the received message in operation 482. The Hop ID generally identifies the current message and its associated "hop" between its sender and receiver.

The Session ID, Call ID and Hop ID may be assigned to a message in any suitable order, besides the order illustrated in FIG. 4C. For particular protocols, the messages may not be able to embed a Session ID and/or a Call ID. For these protocols, the assigned Hop ID, Call ID, and Session ID and their corresponding message information may still be stored as described below.

Information regarding the received message, the current call, and the current session is then stored in operation 484. This information can be stored at the same time or individually for the received message, current call, and current session at various points in the message handling process. No matter when the information is stored, it may be stored in any suitable one or more memory device(s).

In one implementation, the Hop ID, Call ID, and Session ID and their associated information regarding the message, call, and session are stored in a repository. FIG. 4D is illustrates a Message Correlation Table 490 for correlating information regarding each message, a Call Correlation Table 492 for correlating information regarding each call, and a Session Correlation Table 494 for correlating information regarding each session. The Tables 490, 492, and 494 may be stored in repository 240. The repository may be formed from any suitable number of databases stored on any suitable number of memories on any suitable number of computer systems.

As shown, the Message Correlation Table 490 includes one or more entries for each message. Each entry includes correlation information for each message. In this embodiment, each entry corresponds to a particular message and includes the particular message's Hop ID, message information regarding the particular message, the particular message's Call ID, and the particular message's Session ID. The message information may include any information relevant to the particular message, such as the message's sending service and receiving service, whether the message has completed its transmission (e.g., to its intended destination service), and a reason or error log regarding why a message has failed to complete its hop, selected message content, the size of the message, the receiving and sending times for the message, the topic of the message, the status on processing steps taken on the message, the protocols used in receiving and sending the message, etc. The message's session ID may be assigned by the Message Interchange Network, embedded in the message received into the Message Interchange Network, or inferred from the Call ID embedded in the message (e.g., the same session to which the Call ID is associated).

As shown, a message having Hop ID equal to "hop1" belongs to the same call as a message identified by Hop ID "hop2." This same call is identified by Call ID "call1." Additionally, another message having Hop ID "hop3" belongs to a call identified by Call ID "call2", while another message having Hop ID "hop4" belongs to a call identified by Call ID "call3." Also illustrated in the example of FIG. 4D, messages having Hop ID's "hop1", "hop2", and "hop3" all belong to a same session identified by Session ID "session1." In contrast, the message having Hop ID "hop4" belongs to a different session having a Session ID "session2."

In an alternative embodiment, a service could define a message field that is to be used as a message identifier. For example, the profile information for a service could include an XPath expression designating a field in XML messages. In this embodiment, the Message Interchange Network would extract the value of the field from a received message and store the custom message identifier along with the assigned Call or Session ID. This alternative implementation then enables a service to query for correlation information using their own identifier, rather then necessarily the assigned Call or Session ID's.

The Call Correlation Table 492 also includes one or more entries for each call. As shown, each entry includes a Call ID for a particular call and call information regarding the particular call. The call information for a particular call may include an indication as to whether the particular call is complete, a reason for the particular call not completing, the type of call, the receiving and sending times for the call, the sender and recipient services of the call, the status of policy evaluation for the call, the set of hops in the call, etc.

The Session Correlation Table 494 includes one or more entries for each session. Each entry for a particular session generally includes a Session ID for the particular session and session information regarding the particular session. The session information for a particular session may include any information relevant to a particular session such as, the calculated or executed route for messages sent within such particular session, the size of each message at each stage in the route, the identity and status of each service within the route paths of the particular session, whether a session has been completed, and reasons for a session failing to complete, the initiating time and completion time for the session, the set of calls in the session, etc.

The tables shown in FIG. 4D illustrate only one embodiment of storing correlation information. Any other suitable set of tables and relationships among tables may be used to store correlation information. For example, the message route of a session may not be stored directly in one table, but rather may be inferred from the set of calls and hops related to the session as stored in one or more other tables.

At any time during the correlation process, an entity may query the Message Interchange Network 406 for information which has been correlated together. For example, a service may request correlation information regarding a particular session. In this example, the Message Interchange Network 406 collects all entries within the Correlation Tables 490, 492, and 494 that relate to the requested session's Session ID Likewise, an entity may request correlation information regarding a particular service, route, call, time period, message status, etc.

The Message Interchange Network 406 preferably determines whether a request service is authorized to receive a compilation of its requested correlation information. This determination may be performed in any suitable manner. In one implementation, the requesting service is authorized when the requested information is in any way related to a service owned by the requesting service's organization. For example, a service may request correlation information regarding any messages sent by such requesting service, and any messages from calls or sessions belonging to the same call or session as the sent messages. In another implementation, the requesting service may request correlation information which is related to any one message which contains an identifier of the requesting service.

The correlation techniques allow end points or services to correlate through an intermediary which handles ID assignments. Thus, the end points or services do not have to separately negotiate the use of an ID for their communication exchanges with every service. As a result, this approach greatly simplifies correlation of complex message interchanges over a computer network between diverse services and/or end point entities.

In summary, since an intermediary network (e.g., message interchange network) handles identification of messages, calls, and sessions, as well as correlation of information related to same, users of such intermediary network do not have to implement any procedures for correlation. Since an intermediary is performing the correlation of messages sent between diverse and distributed services, any end point or service can also easily gain a clear picture as to what is happening with messages sent as a result of its interactions with such diverse services. Since the retained correlation information is performed by a single intermediary network, the correlation information is standardized and easily compiled into a clear summary of interactions results.

As thus described, Message Interface Network 150 enables flexible interaction between services. Several embodiments for provisioning or setting up services with Message Interface Network 150 and routing messages through Message Interface Network 150 between such provisioned services are further described in the above referenced Lev Brouk et al. U.S. patent application.

Generally, the correlation techniques may be implemented on software and/or hardware. For example, it can be implemented in an operating system kernel, in a separate user process, in a library package bound into network applications, on a specially constructed machine, or on a network interface card. In a specific embodiment, the techniques are implemented in software such as an operating system or in an application running on an operating system.

A software or software/hardware hybrid packet processing system is preferably implemented on a general-purpose programmable machine selectively activated or reconfigured by a computer program stored in memory. In one embodiment, portions of the correlation system (e.g., Message Interchange Network) may be implemented on a general-purpose network host machine such as a personal computer or workstation.

Figure 5:
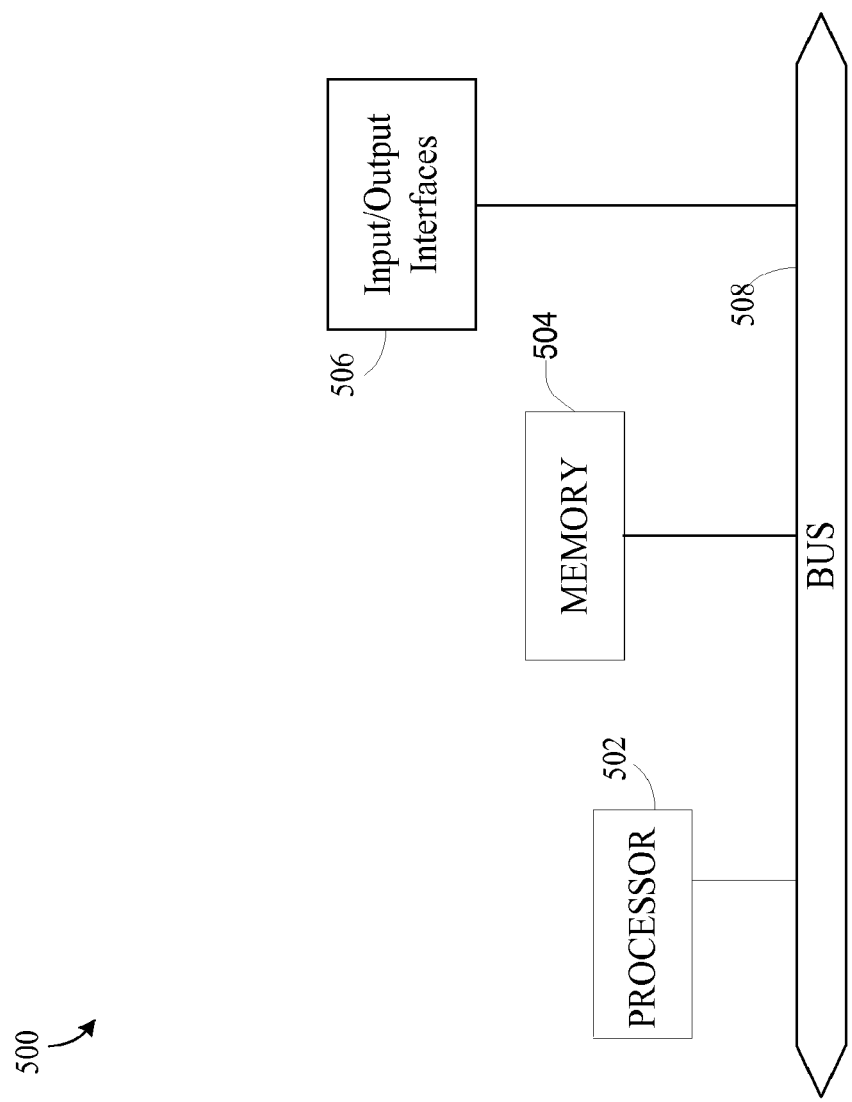
FIG. 5 is a diagrammatic representation of an example computer system in which some implementations may be provided.

Referring now to FIG. 5 a computer system 500 suitable for implementing some disclosed techniques includes a master central processing unit (CPU) 502, one or more memory 504, input and output interfaces 506, and a bus 508 (e.g., a PCI bus). When acting under the control of appropriate software or firmware, the CPU 502 is responsible for implementing various portions of the disclosed techniques. It preferably accomplishes all these functions under the control of software including an operating system and any appropriate applications software. CPU 502 may include one or more processors such as a processor from the Intel family of microprocessors or the MIPS family of microprocessors. In a specific embodiment, a memory 504 (such as non-volatile RAM and/or ROM) also forms part of CPU 502. However, there are many different ways in which memory could be coupled to the system. Memory block 504 may be used for a variety of purposes such as, for example, caching and/or storing data, programming instructions, etc.

The input and output interfaces 506 typically provide an interface to various I/O devices, such as mouse, keyboard, display, as well as providing an communication interface with other computer systems over a computer network. Among the communication interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

Although the system shown in FIG. 5 is one specific computer system, it is by no means the only system architecture on which the disclosed implementations can be provided.

Regardless of system's configuration, it may employ one or more memories or memory modules (such as, for example, memory block 504) configured to store data, program instructions for the general-purpose network operations and/or the inventive techniques described herein. The program instructions may control the operation of an operating system and/or one or more applications, for example. The memory or memories may also be configured to store information in repository 240, etc.

Because such information and program instructions may be employed to implement some examples of systems/methods described herein, also disclosed are machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing has been described in some detail for purposes of clarity of understanding, it will be apparent that certain changes and modifications may be practiced within the scope of the appended claims. Therefore, the described embodiments should be taken as illustrative and not restrictive, and the disclosure should not be limited to the details given herein but should be defined by the following claims and their full scope of equivalents.

What is claimed is:

1. A database system comprising:
at least one server comprising at least one processor, the at least one server configurable to cause:
providing, at an integration bus, a registry of a plurality of service definitions, each service definition describing a respective set of properties for accessing a respective one of a plurality of external services situated external to the integration bus, the set of properties comprising at least an identification of an external service, a syntax associated with the external service, a description of at least one interface for interacting with the external service using a message flow, authentication information, a mode of message delivery, a window of time during which messages are accepted, and a rule to modify invocation of a service;
processing, at the integration bus, first application-level messages received at the integration bus from a requesting application for delivery to a provider application of a first one of the external services, the processing of a first application-level message comprising processing information regarding the first application-level message, the information comprising a message header of the first application-level message, the message header comprising a message identifier of the first application-level message;
sending, at the integration bus and using the set of properties described by a service definition for accessing the first external service, the first application-level messages to the provider application of the first external service;
processing, at the integration bus, second application-level messages received at the integration bus from the provider application of the first external service; and
sending, at the integration bus, a response message based on at least one of the second application-level messages to the requesting application.

2. The database system of claim 1, wherein: the first application-level messages belong to a first one of a plurality of invocations, each invocation being between a pair of the plurality of external services, at least a portion of the invocations being related to each other by invoking or causing invocation of a same service, and the related invocations belong to a first one of a plurality of sessions.

3. The database system of claim 2, wherein the information is further regarding an invocation and a session.

4. The database system of claim 3, wherein the information further comprises a session identifier of a session.

5. The database system of claim 3, the at least one server further configurable to cause:
processing, at the integration bus, a query received from the requesting application to search the information for a specific application-level message or session; and
sending, to the requesting application, a reply to the query.

6. The database system of claim 5, wherein the query is to search the information for data associated with a designated application-level message.

7. The database system of claim 3, wherein the information for a first session further comprises:
a route for application-level messages of the first session, an identity, and a status of services within the route.

8. A system comprising:
system software stored on a non-transitory computer readable medium for execution by at least one processor, the system software configured to cause:
providing, at an integration bus, a registry of a plurality of service definitions, each service definition describing a respective set of properties for accessing a respective one of a plurality of external services situated external to the integration bus, the set of properties comprising at least an identification of an external service, a syntax associated with the external service, a description of at least one interface for interacting with the external service using a message flow, authentication information, a mode of message delivery, a window of time during which messages are accepted, and a rule to modify invocation of a service;
processing, at the integration bus, first application-level messages received at the integration bus from a requesting application for delivery to a provider application of a first one of the external services, the processing of a first application-level message comprising processing information regarding the first application-level message, the information comprising a message header of the first application-level message, the message header comprising a message identifier of the first application-level message;
sending, at the integration bus and using the set of properties described by a service definition for accessing the first external service, the first application-level messages to the provider application of the first external service;
processing, at the integration bus, second application-level messages received at the integration bus from the provider application of the first external service; and
sending, at the integration bus, a response message based on at least one of the second application-level messages to the requesting application.

9. The system of claim 8, wherein:
the first application-level messages belong to a first one of a plurality of invocations, each invocation being between a pair of the plurality of external services, at least a portion of the invocations being related to each other by invoking or causing invocation of a same service, and the related invocations belong to a first one of a plurality of sessions.

10. The system of claim 9, wherein the information is further regarding an invocation and a session.

11. The system of claim 10, wherein the information further comprises a session identifier of a session.

12. The system of claim 10, the system software further configured to cause:

processing, at the integration bus, a query received from the requesting application to search the information for a specific application-level message or session; and sending, to the requesting application, a reply to the query.

13. The system of claim 12, wherein the query is to search the information for data associated with a designated application-level message.

14. The system of claim 10, wherein the information for a first session further comprises: a route for application-level messages of the first session, an identity, and a status of services within the mute.

15. A computer program product comprising program code to be executed by at least one processor when retrieved from a non-transitory data storage medium, the program code comprising instructions configured to cause:
providing, at an integration bus, a registry of a plurality of service definitions, each service definition describing a respective set of properties for accessing a respective one of a plurality of external services situated external to the integration bus, the set of properties comprising at least an identification of an external service, a syntax associated with the external service, a description of at least one interface for interacting with the external service using a message flow, authentication information, a mode of message delivery, a window of time during which messages are accepted, a and a rule to modify invocation of a service;
processing, at the integration bus, first application-level messages received at the integration bus from a requesting application for delivery to a provider application of a first one of the external services, the processing of a first application-level message comprising processing information regarding the first application-level message, the information comprising a message header of the first application-level message, the message header comprising a message identifier of the first application-level message;
sending, at the integration bus and using the set of properties described by a service definition for accessing the first external service, the first application-level messages to the provider application of the first external service;
processing, at the integration bus, second application-level messages received at the integration bus from the provider application of the first external service; and
sending, at the integration bus, a response message based on at least one of the second application-level messages to the requesting application.

16. The computer program product of claim 15, wherein: the first application-level messages belong to a first one of a plurality of invocations, each invocation being between a pair of the plurality of external services, at least a portion of the invocations being related to each other by invoking or causing invocation of a same service, and the related invocations belong to a first one of a plurality of sessions.

17. The computer program product of claim 16, wherein the information is further regarding an invocation and a session.

18. The computer program product of claim 17, wherein the information further comprises a session identifier of a session.

19. The computer program product of claim 17, the instructions further configured to cause:
processing, at the integration bus, a query received from the requesting application to search the information for a specific application-level message or session; and
sending, to the requesting application, a reply to the query.

20. The computer program product of claim 19, wherein the query is to search the information for data associated with a designated application-level message.

21. The computer program product of claim 17, wherein the information for a first session further comprises:
a route for application-level messages of the first session, an identity, and a status of services within the route.

* * * * *